US012452752B2

United States Patent
Kim et al.

(10) Patent No.: US 12,452,752 B2
(45) Date of Patent: *Oct. 21, 2025

(54) COMMUNICATION METHOD AND DEVICE IN MOBILE COMMUNICATION SYSTEM

(71) Applicant: SAMSUNG ELECTRONICS CO., LTD., Suwon-si (KR)

(72) Inventors: Donggun Kim, Suwon-si (KR); Soenghun Kim, Suwon-si (KR); Sangyeob Jung, Suwon-si (KR); Milos Tesanovic, Staines (GB); Anil Agiwal, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

This patent is subject to a terminal disclaimer.

(21) Appl. No.: 17/663,630

(22) Filed: May 16, 2022

(65) Prior Publication Data
US 2022/0353764 A1 Nov. 3, 2022

Related U.S. Application Data

(63) Continuation of application No. 17/250,312, filed as application No. PCT/KR2019/008025 on Jul. 2, 2019, now Pat. No. 11,337,125.

(30) Foreign Application Priority Data

Jul. 2, 2018 (KR) ........................ 10-2018-0076639

(51) Int. Cl.
*H04W 36/02* (2009.01)
*H04W 36/08* (2009.01)
(Continued)

(52) U.S. Cl.
CPC .......... *H04W 36/02* (2013.01); *H04W 36/08* (2013.01); *H04W 76/19* (2018.02); *H04W 80/08* (2013.01)

(58) Field of Classification Search
CPC . H04W 76/19; H04W 36/0069; H04W 76/27; H04W 80/02; H04W 36/0055;
(Continued)

(56) References Cited

U.S. PATENT DOCUMENTS 8,804,742 B2  8/2014 Kim et al.
10,455,456 B2 10/2019 Jang et al.
(Continued)

FOREIGN PATENT DOCUMENTS

KR  10-2013-0093774 A  8/2013
KR  10-2018-0090658 A  8/2018
(Continued)

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.2.0 (Mar. 2017), 43 pages.
(Continued)

*Primary Examiner* — Nam T Huynh

(57) ABSTRACT

The present disclosure relates to a communication technique for converging, with an IoT technology, a 5G communication system for supporting a higher data transmission rate beyond a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. The present disclosure relates to a method for a terminal in
(Continued)

a communication system and a device for performing same, the method comprising the steps of: receiving, from a higher layer device, information indicating packet data convergence protocol (PDCP) data recovery; identifying first data associated with transmission for the PDCP data recovery, from data which have been stored in a signaling radio bearer (SRB) before the information is received; and transmitting the first data to a lower layer.

20 Claims, 21 Drawing Sheets

(51) Int. Cl.
*H04W 76/19* (2018.01)
*H04W 80/08* (2009.01)

(58) Field of Classification Search
CPC . H04W 36/0005; H04W 36/02; H04W 36/08; H04W 36/0235; H04W 36/0016
See application file for complete search history.

(56) References Cited

U.S. PATENT DOCUMENTS

| | | |
|---|---|---|
| 2017/0055283 A1 | 2/2017 | Shrivastava et al. |
| 2018/0092146 A1 | 3/2018 | Hong et al. |

FOREIGN PATENT DOCUMENTS

| | | |
|---|---|---|
| WO | 2016/159634 A1 | 10/2016 |
| WO | 2018/232108 A1 | 12/2018 |

OTHER PUBLICATIONS

"3rd Generation Partnership Project; Technical Specification Group Radio Access Network; NR; Packet Data Convergence Protocol (PDCP) specification (Release 15)", 3GPP TS 38.323 V15.2.0 (Jun. 2018), 26 pages.
International Search Report dated Oct. 28, 2019 in connection with International Patent Application No. PCT/KR2019/008025, 2 pages.
Written Opinion of the International Searching Authority dated Oct. 28, 2019 in connection with International Patent Application No. PCT/KR2019/008025, 4 pages.
"3rd Generation Partnership Project; Technical Specification Group Radio Access Network; NR; Radio Resource Control (RRC) protocol specification", 3GPP TS 38.331 V15.2.1, (Jun. 2018), 303 pages.
Ericsson, "Handling of PDCP discard for SRBs during mobility without key change", 3GPP TSG-RAN WG2 #AH1801, Jan. 22-26, 2018, Tdoc R2-1801071, 2 pages.
Samsung, "Impact on Control and User Plane procedure due to Intra and Inter CU HO", 3GPP TSG RAN WG2#NR_AdHoc#2 Meeting, Jun. 27-29, 2017, R2-1707105, 4 pages.
Office Action dated Jul. 19, 2022 in connection with Korean Patent Application No. 10-2018-0076639, 10 pages.

COMMUNICATION METHOD AND DEVICE IN MOBILE COMMUNICATION SYSTEM

CROSS-REFERENCE TO RELATED APPLICATIONS

This application is a continuation of application Ser. No. 17/250,312, filed Dec. 31, 2020, now U.S. Pat. No. 11,337,125 issued May 17, 2022, which is a 371 of International Application No. PCT/KR2019/008025 filed on Jul. 2, 2019, which claims priority to Korean Patent Application No. 10-2018-0076639 filed on Jul. 2, 2018, the disclosures of which are herein incorporated by reference in their entirety.

BACKGROUND

1. Field

The disclosure relates to a method and an apparatus for preventing data loss due to handover within a BS in a next-generation mobile communication system.

Further, the disclosure relates to a method and an apparatus for supporting a ultra-reliable low latency communication (URLLC) service to a UE operating in a radio resource control (RRC)-connected mode in a next-generation mobile communication system and, more particularly, to a method and an apparatus for determining a modulation and coding scheme (MCS) of a UE operating in an RRC-connected mode.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a next-generation mobile communication system, various structures of BSs can be implemented and various radio access technologies may coexist. The technical problems to be solved by embodiments of the disclosure are to provide a method of preventing data loss when a UE changes a radio link to another cell or another BS because the UE performs a handover or changes a bearer type.

Further, the technical problems to be solved by embodiments of the disclosure are to provide a method and an apparatus for supporting URLLC service.

SUMMARY

In accordance with an aspect of the disclosure, a method of a UE in a communication system includes: receiving information indicating packet data convergence protocol (PDCP) data recovery from a higher layer device; identifying first data related to transmission for the PDCP data recovery among data stored in a signaling radio bearer (SRB) before receiving the information; and transmitting the first data to a lower layer.

In accordance with another aspect of the disclosure, a UE in a communication system includes: a transceiver; and a controller connected to the transceiver and configured to perform control to receive information indicating packet data convergence protocol (PDCP) data recovery from a higher layer device, identify first data related to transmission for the PDCP data recovery among data stored in a signaling radio bearer (SRB) before receiving the information, and transmit the first data to a lower layer.

The technical problems to be solved by embodiments of the disclosure are not limited to the above-mentioned technical problems, and technical problems which have not been mentioned may be clearly understood by those skilled in the art on the basis of the following description.

According to embodiments of the disclosure, it is possible to provide a method of performing a handover without any data loss by supporting a detailed method of preventing data loss which may be caused by a handover of a UE in a next-generation mobile communication system.

Further, according to embodiment of the disclosure, it is possible to provide a method of determining a modulation and coding scheme for supporting URLLC service.

DETAILED DESCRIPTION

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known relevant functions or configurations will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB". Further, the term "terminal" may indicate mobile phones, NB-IoT devices, or sensors, and may also indicate other wireless communication devices.

First Embodiment

Figure 1A:
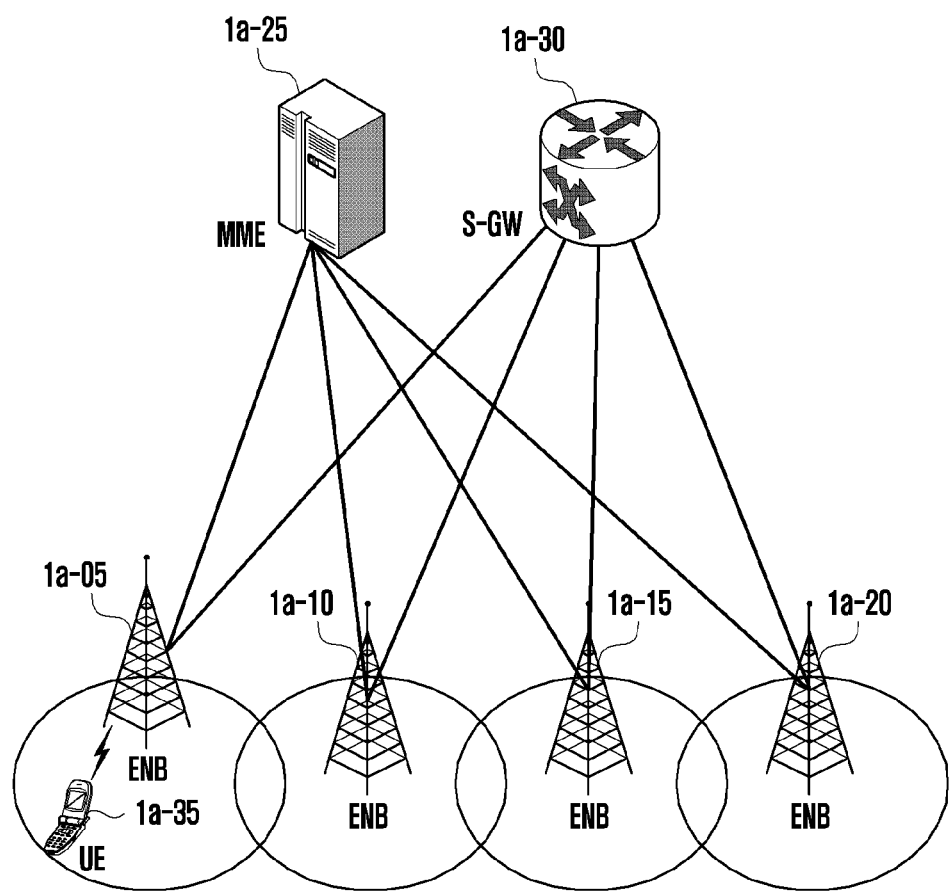
FIG. 1A illustrates a structure of an LTE system according to an embodiment of the disclosure.

FIG. 1A illustrates a structure of an LTE system according to an embodiment of the disclosure.

Referring to FIG. 1A, a radio access network of the LTE system includes next-generation base stations (hereinafter, referred to as evolved node Bs (ENBs), Node Bs, or base stations) 1a-05, 1a-10, 1a-15, and 1a-20, a mobility management entity (MME) 1a-25, and a serving gateway (S-GW) 1a-30. A user terminal (hereinafter, referred to as a user equipment (UE) or a terminal) 1a-35 accesses an external network through the ENBs 1a-05 to 1a-20 and the S-GW 1a-30.

In FIG. 1A, the ENBs 1a-05, 1a-10, 1a-15, and 1a-20 correspond to the existing node Bs of the UMTS system. The ENBs 1a-05, 1a-10, 1a-15, and 1a-20 are connected to the UE 1a-35 through a radio channel, and perform a more complicated role than the conventional node B. In the LTE system, since all user traffic including areal time service such as a VoIP (Voice over IP) through an Internet protocol are serviced through a shared channel, an apparatus for collecting and scheduling status information on buffer statuses of UEs, available transmission power status, and channel statuses is required, and the ENBs 1a-05, 1a-10, 1a-15, and 1a-20 serve as this apparatus. One ENB generally controls a plurality of cells. For, example, in order to implement a transmission rate of 100 Mbps, the LTE system uses an Orthogonal Frequency Division Multiplexing (OFDM) as a wireless access technology in a bandwidth of 20 MHz. Further, an adaptive modulation and coding (AMC) scheme of determining a modulation scheme and a channel coding rate is applied depending on the channel status of the UE. The S-GW 1*a*-30 is a device for providing a data bearer, and generates or removes the data bearer under the control of the MME 1*a*-25. The MME 1*a*-25 is a device that serves to perform not only a function of managing mobility of the UE 1*a*-35 but also various control functions and is connected to the plurality of ENBs 1*a*-05, 1*a*-10, 1*a*-15, and 1*a*-20.

Figure 1B:
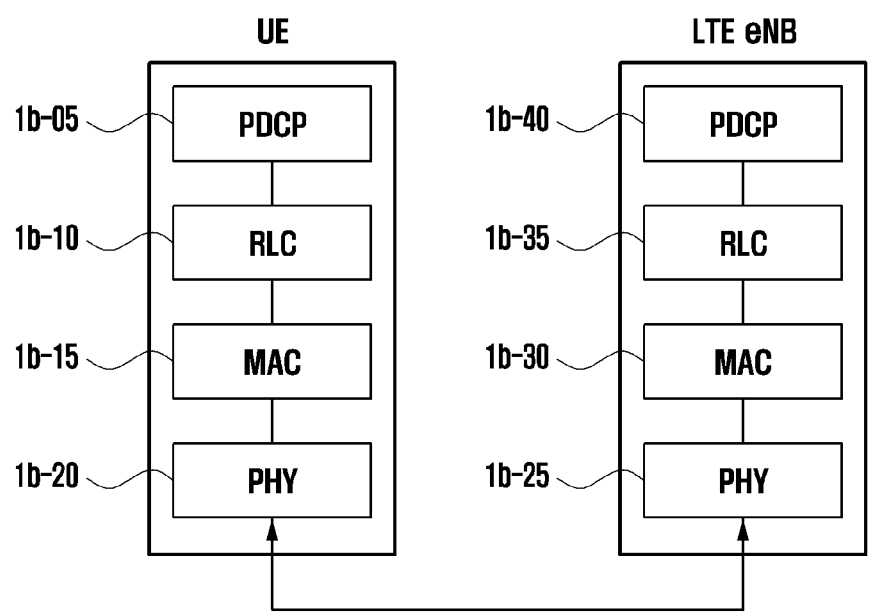
FIG. 1B illustrates a structure of a wireless protocol in the LTE system according to an embodiment of the disclosure.

FIG. 1B illustrates a structure of a wireless protocol in the LTE system according to an embodiment of the disclosure.

Referring to FIG. 1B, the UE and the ENB include packet data convergence protocols (PDCPs) 1*b*-05 and 1*b*-40, radio link controls (RLCs) 1*b*-10 and 1*b*-35, and medium access controls (MACs) 1*b*-15 and 1*b*-30, respectively, in the wireless protocol of the LTE system. The packet data convergence protocols (PDCPs) 1*b*-05 and 1*b*-40 perform an operation of compressing/reconstructing an IP header. Main functions of the PDCP are described below.

- Header compression and decompression function ((Header compression and decompression: ROHC only)
- User data transmission function (Transfer of user data)
- Sequential delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU removal function (Timer-based SDU discard in uplink)

Radio link control (RLC) 1*b*-10 and 1*b*-35 reconfigure the PDCP packet data unit (PDU) to be the proper size and perform an automatic repeat request (ARQ) operation. Main functions of the RLC are described below.

- Data transmission function (Transfer of upper layer PDUs)
- ARQ function (Error Correction through ARQ (only for AM data transfer))
- Concatenation, segmentation, and reassembly function (Concatenation, segmentation, and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplication detection function (only for UM and AM data transfer))
- Error detection function (Protocol error detection (only for AM data transfer))
- RLC SDU deletion function (RLC SDU discard (only for UM and AM data transfer))
- RLC re-establishment function (RLC re-establishment)

The MACs 1*b*-15 and 1*b*-30 are connected with various RLC layer devices included in one entity, and perform an operation for multiplexing RLC PDUs to the MAC PDU and demultiplexing the RLC PDUs from the MAC PDU. Main functions of the MAC are described below.

- Mapping function (Mapping between logical channels and transport channels)
- Multiplexing and demultiplexing function (Multiplexing/demultiplexing of MAC SDUs belonging to one or different logical channels into/from transport blocks (TB) delivered to/from the physical layer on transport channels)
- Scheduling information report function (Scheduling information reporting)
- HARQ function (Error correction through HARQ)
- Logical channel priority control function (Priority handling between logical channels of one UE)
- UE priority control function (Priority handling between UEs by means of dynamic scheduling)
- MBMS service identification function (MBMS service identification)
- Transport format selection function (Transport format selection)
- Padding function (Padding)

The PHY layers 1*b*-20 and 1*b*-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 1C:
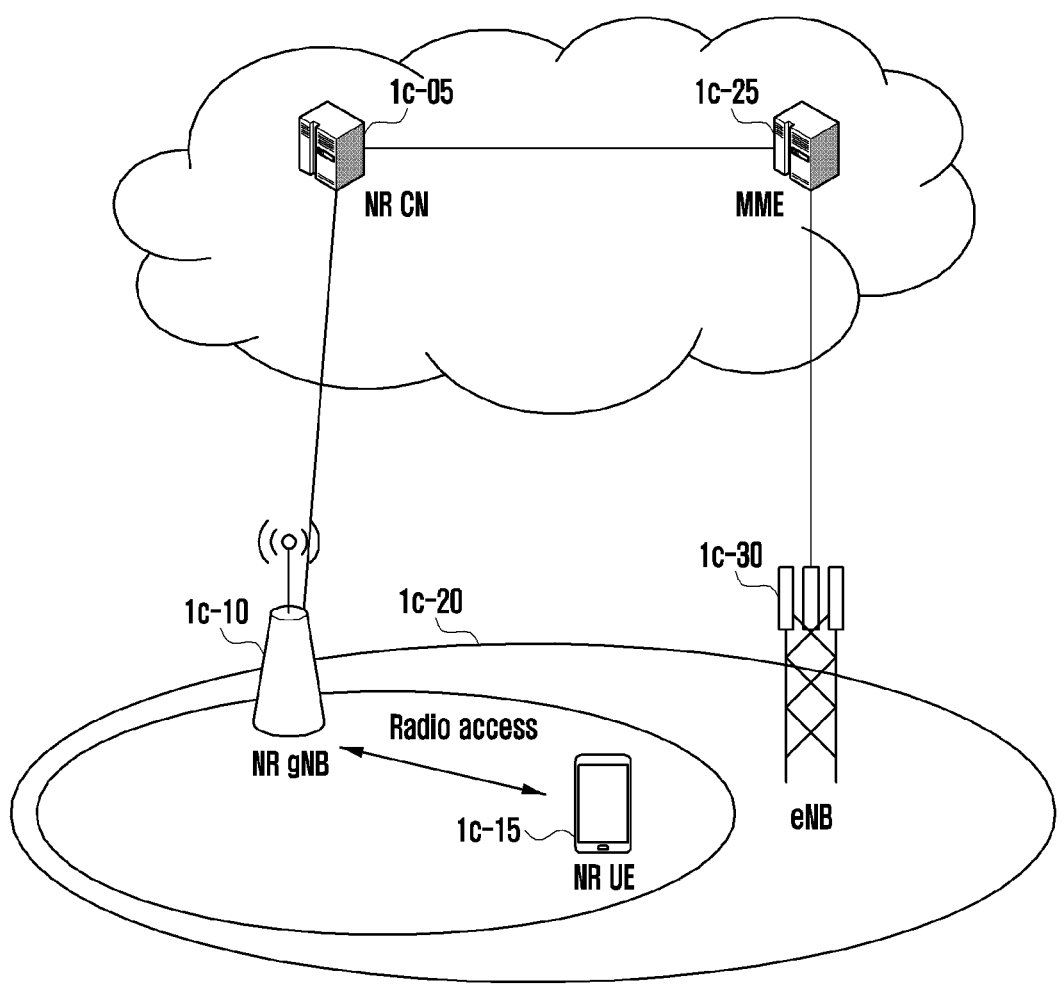
FIG. 1C illustrates a structure of a next-generation mobile communication system according to an embodiment of the disclosure.

FIG. 1C illustrates a structure of a next-generation mobile communication system according to an embodiment of the disclosure.

Referring to FIG. 1C, a radio access network of a next-generation mobile communication system (hereinafter, NR or 2*g*) includes a next-generation base station 1*c*-10 (new-radio node B) (hereinafter, referred to as an NR gNB or an NR base station) and a new-radio core network (NR CN) 1*c*-05. A user terminal 1*c*-15 (hereinafter, referred to as a new radio user equipment (NR UE) or a terminal) accesses an external network through the NR gNB 1*c*-10 and the NR CN 1*c*-05.

In FIG. 1C, the NR gNB 1*c*-10 corresponds to an evolved Node B (eNB) of the conventional LTE system. The NR gNB 1*c*-10 may be connected to the NR UE 1*c*-15 through a radio channel and may provide a better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR gNB 1*c*-10. One NR gNB generally controls a plurality of cells. The NR gNB may have a bandwidth wider than the conventional maximum bandwidth in order to implement super-high-speed data transmission compared to conventional LTE and may apply orthogonal frequency division multiplexing (OFDM) through radio access technology and further apply beam-forming technology. Further, an adaptive modulation and coding (AMC) scheme of determining a modulation scheme and a channel coding rate is applied depending on the channel status of the UE. The NR CN 1*c*-05 performs a function of supporting mobility, configuring a bearer, and configuring a QoS. The NR CN 1*c*-05 is a device that serves to perform a function of managing mobility of the UE 1*c*-15 and various control functions and is connected to a plurality of NR gNBs. Further, the next-generation mobile communication system may be linked to the conventional LTE system, and the NR CN 1*c*-05 is connected to an MME 1*c*-25 through a network interface. The MME 1*c*-25 is connected to the eNB 1*c*-30 which is the conventional base station.

Figure 1D:
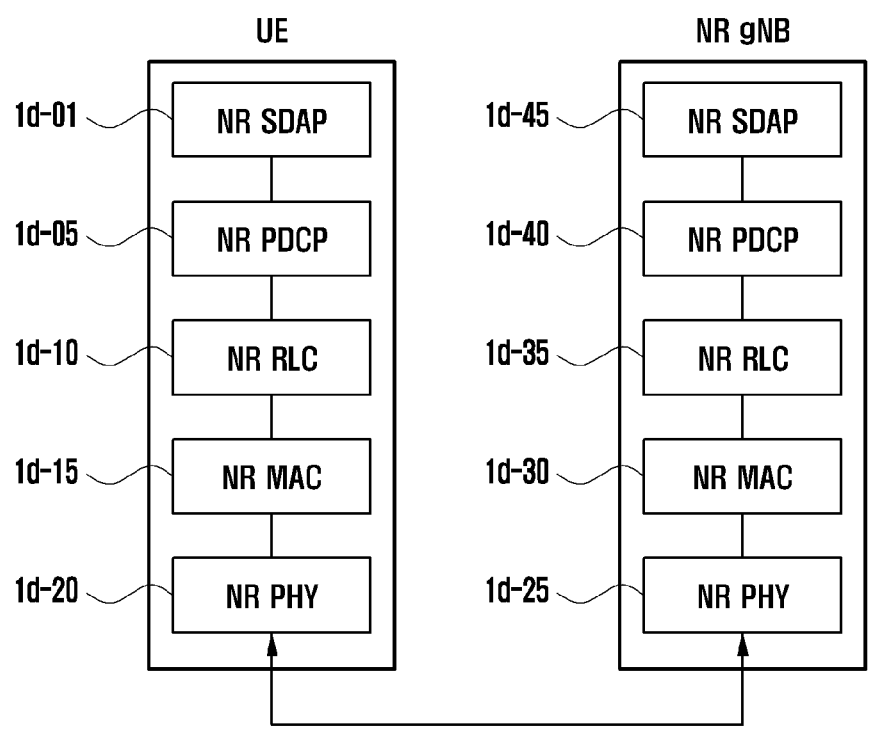
FIG. 1D illustrates a structure of a wireless protocol of the next-generation mobile communication system according to an embodiment of the disclosure.

FIG. 1D illustrates a structure of a wireless protocol of the next-generation mobile communication system according to an embodiment of the disclosure.

Referring to FIG. 1D, the wireless protocol of the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30 in the UE and the NR gNB.

The main functions of the NR SDAPs 1d-01 and 1d-45 may include some of the following functions.

- User data transmission function (transfer of user-plane data)
- Function of mapping QoS flow and a data bearer for uplink and downlink (mapping between a QoS flow and a DRB for both DL and UL)
- Function of marking a QoS flow ID for uplink and downlink (marking QoS flow ID in both DL and UL packets)
- Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 1d-05 and 1d-40 may include some of the following functions.

- Header compression and decompression function (Header compression and decompression: ROHC only)
- User data transmission function (Transfer of user data)
- Sequential delivery function (In-sequence delivery of upper layer PDUs)
- Non-sequential delivery function (Out-of-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions.

- Data transmission function (Transfer of upper layer PDUs)
- Sequential delivery function (In-sequence delivery of upper layer PDUs)
- Non-sequential delivery function (Out-of-sequence delivery of upper layer PDUs)
- ARQ function (Error correction through ARQ)
- Concatenation, segmentation, and reassembly function (Concatenation, segmentation, and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU deletion function (RLC SDU discard)
- RLC re-establishment function (RLC re-establishment)

The sequential delivery function (In-sequence delivery) of the NR RLC device is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1d-15 and 1d-30 may be connected to a plurality of NR RLC layer devices included in one entity, and the main functions of the NR MACs may include some of the following functions.

- Mapping function (Mapping between logical channels and transport channels)
- Multiplexing and demultiplexing function (Multiplexing/demultiplexing of MAC SDUs)

Scheduling information report function (Scheduling information reporting)
HARQ function (Error correction through HARQ)
Logical channel priority control function (Priority handling between logical channels of one UE)
UE priority control function (Priority handling between UEs by means of dynamic scheduling)
MBMS service identification function (MBMS service identification)
Transport format selection function (Transport format selection)
Padding function (Padding)

The NR PHY layers 1*d*-20 and 1*d*-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 1E:
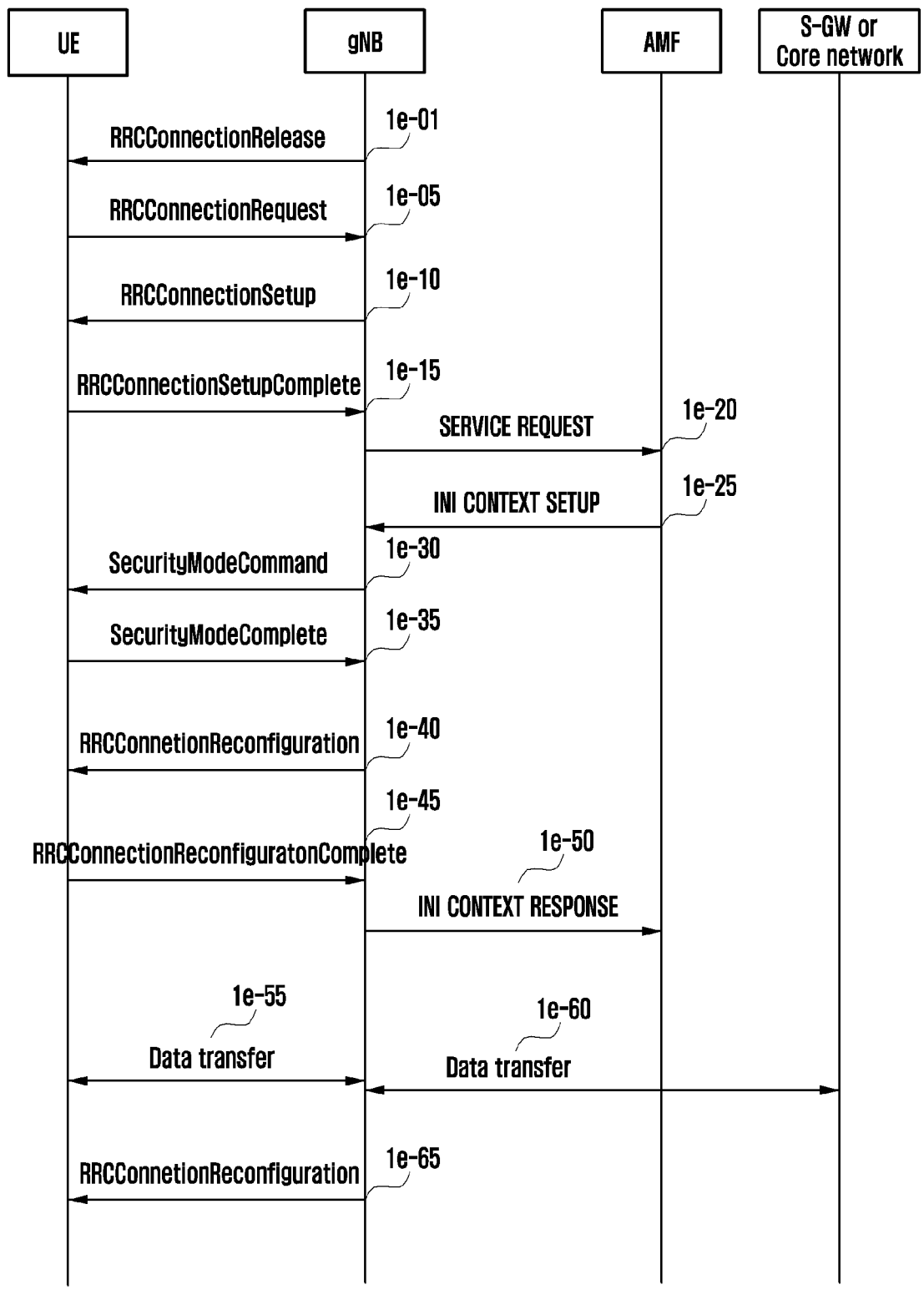
FIG. 1E illustrates a procedure in which a UE performs an RRC connection configuration with a BS when the UE establishes a connection with a network in a next-generation mobile communication system according to an embodiment of the disclosure.

FIG. 1E illustrates a procedure in which the UE configures an RRC connection with the gNB when configuring a connection with a network in a next-generation mobile communication system according to an embodiment of the disclosure.

Referring to FIG. 1E, when the UE transmitting and receiving data in the RRC-connected mode has no data transmission/reception for a predetermined reason or for a predetermined time, the gNB may transmit an RRCConnectionRelease message to the UE, and the UE may switch to the RRC idle mode in step 1*e*-01. When the UE of which the connection is not currently configured (hereinafter, referred to as an idle-mode UE) has data to be transmitted, the UE performs an RRC connection establishment process with the gNB.

The UE establishes backward transmission synchronization with the gNB through a random access process and transmits an RRCConnectionRequest message to the gNB in step 1*e*-05. The RRCConnectionRequest message may include a reason (establishmentCause) to establish the connection with an identifier of the UE.

The gNB transmits an RRCConnectionSetup message to allow the UE to establish the RRC connection in step 1*e*-10. The RRCConnectionSetup message may include at least one piece of configuration information for each logical channel, configuration information for each bearer, configuration information of the PDCP layer device, configuration information of the RLC layer device, or configuration information of the MAC layer device.

When the UE performs a handover, an indicator indicating whether to retransmit pre-configured RRC messages to a target eNB or a cell may be configured in the RRCConnectionSetup message. For example, the retransmission of RRC messages transmitted within several seconds before a handover indication message is received, a handover is performed, or an RRC message is received may be indicated. The indicator may indicate each of the pre-configured RRC messages. That is, several indicators may indicate whether to retransmit RRC messages. Alternatively, whether to perform retransmission may be indicated in the form of a bitmap indicating each RRC message.

The RRCConnectionSetup message may indicate that an indicator for performing a PDCP data recovery procedure is included in PDPC configuration information. The message may indicate that an indicator indicating whether to perform the PDCP data recovery procedure for a signaling radio bearer (SRB) or a data radio bearer (DRB) is included in bearer configuration information. The message may indicate that an indicator indicating whether to discard data left in the PDCP layer device for the SRB or the DRB is included in bearer configuration information.

The RRCConnectionSetup message may indicate that, when a PDCP reestablishment procedure is performed, an indicator indicating whether to perform accumulated retransmission or selective retransmission for an acknowledged mode (AM) DRB is included in bearer configuration information.

The UE establishing the RRC connection transmits an RRCConnectionSetupComplete to the gNB in 1*e*-15. The RRCConnectionSetupComplete message may include a control message of SERVICE REQUEST by which the UE makes a request for configuring a bearer for a predetermined service to the access management function (AMF) or the MME. The gNB transmits the SERVICE REQUEST message included in the RRCConnetionSetupComplete message to the AMF or the MME in step 1*e*-20. The AMF or the MME may determine whether to provide the service requested by the UE.

When it is determined to provide the service requested by the UE on the basis of the determination result, the AMF or the MME transmits an INITIAL CONTEXT SETUP REQUEST message to the gNB in step 1*e*-25. The INITIAL CONTEXT SETUP REQUEST message may include quality of service (QoS) information to be applied to data radio bearer (DRB) configuration and security-related information to be applied to the DRB (for example, a security key and a security algorithm).

The gNB exchanges a SecurityModeCommand message in step 1*e*-30 and a SecurityModeComplete message in step 1*e*-35 in order to set security with the UE. When security has been completely set, the gNB transmits an RRCConnection-Reconfiguration message to the UE in step 1*e*-40.

When the UE performs a handover, an indicator indicating whether to retransmit pre-configured RRC messages to a target BS or a cell may be configured in the RRCConnectionReconfiguration message. For example, the retransmission of RRC messages transmitted within several seconds before a handover indication message is received, a handover is performed, or an RRC message is received may be indicated. The indicator may indicate each of the pre-configured RRC messages. That is, several indicators may indicate whether to retransmit RRC messages. Alternatively, whether to perform the retransmission may be determined in the form of a bitmap indicating each RRC message.

The RRCConnectionReconfiguration message may indicate that an indicator for performing a PDCP data recovery procedure is included in PDPC configuration information. The message may indicate that an indicator indicating whether to perform the PDCP data recovery procedure for an SRB or a DRB is included in bearer configuration information. The message may indicate that an indicator indicating whether to discard data left in the PDCP layer device for the SRB or the DRB is included in bearer configuration information.

The RRCConnectionReconfiguration message may indicate that, when a PDCP reestablishment procedure is performed, an indicator indicating whether to perform accumulated retransmission or selective retransmission for an AM DRB is included in bearer configuration information.

The RRCConnectionReconfiguration message may include configuration information of the DRB for processing user data, and the UE configures the DRB by applying the information and transmits an RRCConnectionReconfigurationComplete message to the gNB in step 1*e*-45. The gNB completely configuring the DRB with the UE may transmit an INITIAL CONTEXT SETUP COMPLETE message to the AMF or the MME and complete the connection in step 1e-50.

When the process has completely finished, the UE transmits and receives data to and from the gNB through a core network in steps 1e-55 and 1e-60. According to some embodiments, the data transmission process largely includes three steps of RRC connection configuration, security configuration, and DRB configuration. Further, the gNB may transmit an RRC Connection Reconfiguration message in order to provide a new configuration to the UE or add or change the configuration for a predetermined reason in step 1e-65.

When the UE performs a handover, an indicator indicating whether to retransmit pre-configured RRC messages to a target BS or a cell may be configured in the RRCConnectionReconfiguration message. For example, the retransmission of RRC messages transmitted within several seconds before a handover indication message is received, a handover is performed, or an RRC message is received may be indicated. The indicator may indicate each of the pre-configured RRC messages. That is, several indicators may indicate whether to retransmit RRC messages. Alternatively, whether to perform the retransmission may be determined in the form of a bitmap indicating each RRC message.

The RRCConnectionReconfiguration message may indicate that an indicator for performing a PDCP data recovery procedure is included in PDPC configuration information. The message may indicate that an indicator indicating whether to perform the PDCP data recovery procedure for a signaling radio bearer (SRB) or a data radio bearer (DRB) is included in bearer configuration information. The message may indicate that an indicator indicating whether to discard data left in the DPCP layer device for a signaling radio bearer (SRB) or a data radio bearer (DRB) is included in bearer configuration information.

The RRCConnectionReconfiguration message may indicate that, when a PDCP reestablishment procedure is performed, an indicator indicating whether to perform accumulated retransmission or selective retransmission for an AM DRB is included in bearer configuration information.

According to an embodiment of the disclosure, the bearer may be a meaning including an SRB and a DRB, the SRB refers to a signaling radio bearer, and the DRB refers to a data radio bearer. An UM DRB is a DRB using an RLC layer device operating in an unacknowledged mode (UM), and an AM DRB is a DRB using the RLC layer device operating in an acknowledged mode (AM).

Figure 1F:
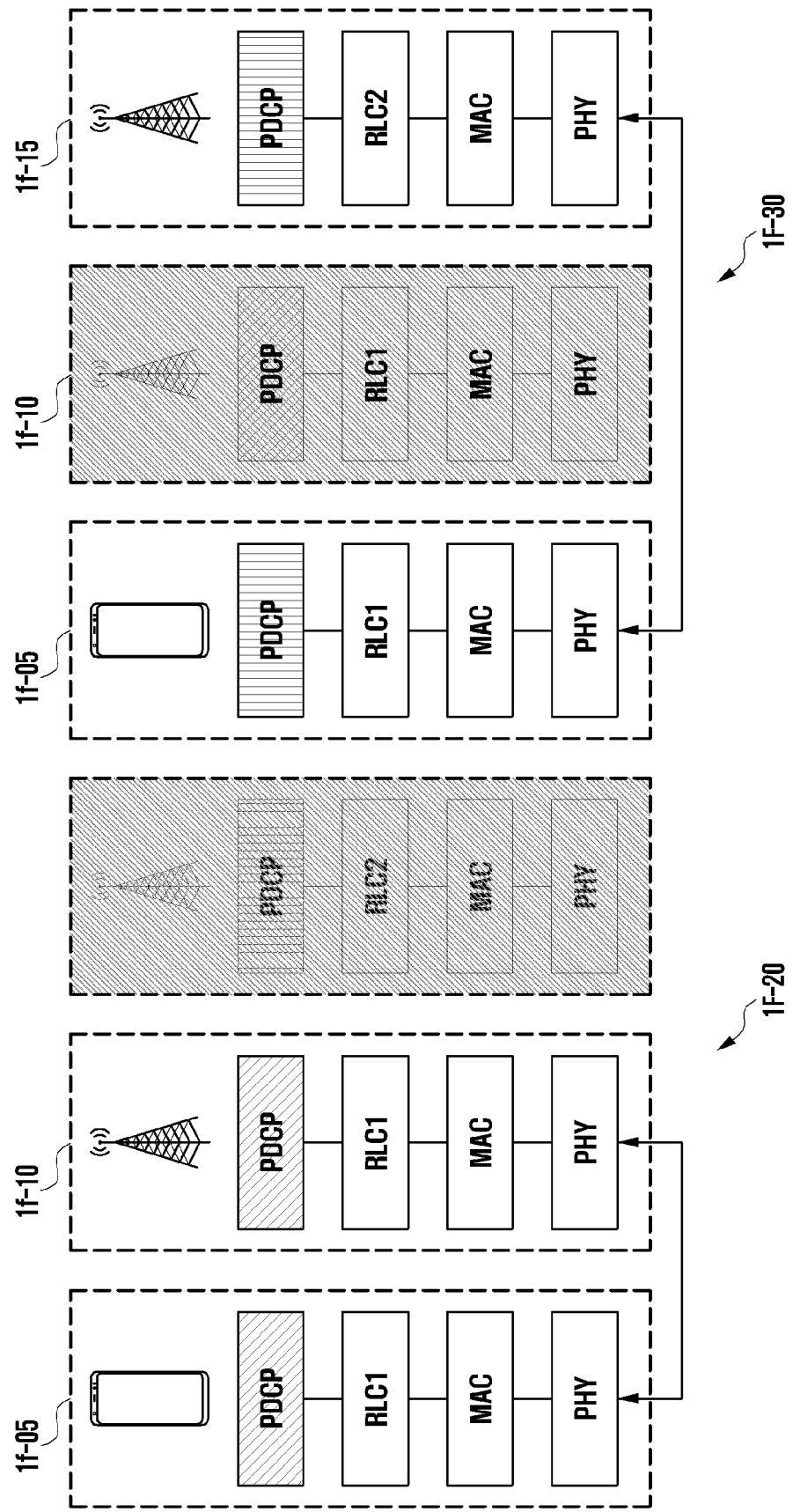
FIG. 1F conceptually illustrates a handover between BSs in a next-generation mobile communication system according to an embodiment of the disclosure.

FIG. 1F conceptually illustrates a handover between BSs in a next-generation mobile communication system according to an embodiment of the disclosure. When a UE 1f-05 configures a network connection with a source BS 1f-10 and receives an RRC message indicating a handover from a BS while transmitting and receiving data, the UE may perform a handover to a cell or a BS indicated by the RRC message in 1f-20 of FIG. 1F. The UE 1f-05 may configure a new network connection with a target BS or a cell 1f-15 and continuously transmit data in 1f-30 of FIG. 1F.

When PDCP layer devices for each bearer of the UE 1f-05 exchange data with PDCP layer devices for each bearer of the source BS 1f-10 and perform a handover as illustrated in 1f-20 of FIG. 1F, the PDCP layer devices are required to exchange data with new PDCP layer devices for each bearer of a target BS 1f-15 as illustrated in 1f-30 of FIG. 1F. When the connection with a new node or BS is configured in a handover procedure, a security key for enhancing security is needed to be newly updated. That is, when the data connections with different nodes are configured, different security keys should be used.

After determining the handover of the UE 1f-05 to the target BS 1f-15, the source BS 1f-10 may indicate a transmission and reception PDCP reestablishment procedure for each bearer to the UE in order to allow the UE 1f-05 successfully complete the handover.

Embodiment 1-1-1 of a PDCP reestablishment procedure between a transmission PDCP layer device (transmitting PDCP entity) and a reception PDCP layer device (receiving PDCP entity) proposed in an embodiment of the disclosure is described below.

The transmission PDCP layer device and the reception PDCP layer device may be included in PDCP layer devices of the UE. The transmission PDCP layer device may correspond to a part that serves to perform transmission among the PDCP layer devices of the UE, and the reception PDCP layer device may correspond to a part that serves to perform a reception function among the PDCP layer devices of the UE. Accordingly, both the transmission PDCP layer device and the reception PDCP layer device may be named as PDCP layer devices of the UE, and may be divided according to functions thereof. Such a concept may be applied to various embodiments of the disclosure.

When a higher layer device (for example, an RRC layer device) makes a request for the PDCP reestablishment procedure, the transmission PDCP layer device performs the following procedure.

1. The transmission PDCP layer device initiates a header compression protocol and starts an unidirectional (U) mode in an initialization and refresh (IR) state if there is no indicator indicating the continuous use of a header compression protocol for UM DRBs and AM DRBs.

2. The transmission PDCP layer device sets window state parameters (for example, TX_NEXT) for UM DRBs and SRBs as initial as initial values.

3. The transmission PDCP layer device discards all stored data (for example, PDCP SDUs or PDCP PDUs) for SRBs (since the data is RRC messages generated to be transmitted to the source BS, the data is discarded not to be transmitted to the target BS).

4. The transmission PDCP layer device applies a new security key received from a higher layer device (for example, an RRC layer device) and an encryption algorithm.

5. The transmission PDCP layer device applies a new security key received from a higher layer device (for example, an RRC layer device) and an integrity protection algorithm.

6. For UM DRBs, the transmission PDCP layer device considers data (for example, PDCP SDUs) which has already received PDCP serial numbers but has not yet been transmitted to a lower layer device as data received from a higher layer (for example, an SDAP layer device or a TCP/IP layer device) and transmits the data in an ascending order of COUNT values (or PDCP serial numbers) allocated before PDCP reestablishment. A data discard timer is not restarted. Specifically, a header compression procedure is performed for the data, an integrity procedure or an encryption procedure is performed again, and a PDCP header is configured and transmitted to the lower layer device.

7. For AM DRBs, the transmission PDCP layer device retransmits or transmits all of data, of which successful transmission from lower layers (for example, RLC layer devices) is not identified, starting from the first data (for example, a PDCP SDU) in an ascending order of COUNT values (or PDCP serial numbers) allocated before PDCP reestablishment. That is, the accumulated retransmission is performed from the first data of which successful transmission is not identified. Specifically, the transmission PDCP layer device performs a header compression procedure for the data, performs an integrity procedure or an encryption procedure again, configures a PDCP header, and transmits the same to the lower layer device.

When the higher layer device (for example, the RRC layer device) makes a request for the PDCP reestablishment procedure, the reception PDCP layer device performs the following procedure.

1. 1. The reception PDCP layer device processes data (for example, PDCP PDUs) received due to reestablishment of lower layer devices (for example, RLC layer devices).

2. The reception PDCP layer device discards all stored data (for example, PDCP SDUs or PDCP PDUs) for SRBs (the data is discarded since the data is RRC messages received from the source BS).

3. If a rearrangement timer runs for SRBs and UM DRBs, the reception PDPC layer device stops and resets the timer, performs a header decompression procedure for all stored data (for example, PDCP SDUs) for UM DRBs and transmits the data to the higher layer device.

4. If there is no indicator indicating the continuous use of a header decompression protocol for AM DRBs, the reception PDCP layer device performs a header decompression procedure for stored data (for example, PDCP SDUs).

5. If there is no indicator indicating the continuous use of a header decompression protocol for UM DRBs and AM DRBs, the reception PDCP layer device initiates a downlink header decompression protocol and starts in a unidirectional (U) mode of a no context (NC) state.

6. The reception PDPC layer device sets window parameters (for example, RX_NEXT and RX_DELIV) for UM DRBs and SRBs as initial values.

7. The reception PDCP layer device applies a new security key received from a higher layer device (for example, an RRC layer device) and an encryption/decryption algorithm.

8. The reception PDCP layer device applies a new security key received from a higher layer device (for example, an RRC layer device) and an integrity protection/verification algorithm.

In Embodiment 1-1-1 of the disclosure, the transmission PDCP layer device always performs accumulated retransmission. However, it is possible to perform selective retransmission so as to prevent unnecessary transmission and the waste of transmission resources. The selective retransmission refers to retransmission of only data of which successful transmission (RLC ACK) from lower layer devices (for example, RLC layer devices) is not identified by the transmission PDCP layer device.

However, in the case of the handover illustrated in FIG. 1F, the PDCP reestablishment procedure triggered by the BS may cause data loss if selective retransmission is always used. It is because transmission of all data which the PDCP layer device of the source BS 1f-10 has successfully received to the PDCP layer device of the target BS 1f-15 is not mandatory. Accordingly, although the UE 1f-05 receives a report (RLC ACK) indicating successful reception from the source BS 1f-10, the UE 1f-05 is required to retransmit data of which successful transmission is identified to the target BS 1f-15 through RLC ACK. That is, the UE 1f-05 is required to perform accumulated retransmission corresponding to sequential retransmission of data, of which successful transmission is not identified in the PDCP reestablishment procedure, starting from data corresponding to a first PDCP serial number. Accordingly, even though there is data, of which successful transmission (reception of RLC ACK) from the lower layer is identified, among data having serial numbers larger than the first PDCP serial number, of which successful transmission is not identified, the UE 1f-05 is required to retransmit the data.

However, if the PDCP layer device of the source BS 1f-10 transmits successfully received data to all PDCP layer devices of the target BS 1f-15, the UE 1f-05 may perform the selective retransmission method described in Embodiment 1-1-1 of the disclosure and thus prevent unnecessary retransmission and the waste of transmission resources. Accordingly, it is possible to indicate whether to perform selective retransmission or accumulated retransmission through a newly defined indicator when the source BS 1f-10 performs the PDCP reestablishment procedure for the UE 1f-05. For example, the selective retransmission may be performed when the indicator exists, and the accumulated retransmission may be performed when the indicator does not exist. Alternatively, a 1-bit indicator may be defined, and the selective retransmission may be performed when the 1-bit indicator is true and the accumulated retransmission may be performed when the 1-bit indicator is false. Further, the indicator may be defined by an RRC message, may be indicated by PDCP configuration information, and may be transmitted while being inserted into a handover indication message or an RRC reconfiguration message.

Embodiment 1-1-2 of the PDCP reestablishment procedure between the transmission PDCP layer device (transmitting PDCP entity) and the reception PDCP layer device (receiving PDCP entity) proposed by an embodiment of the disclosure in which the selective retransmission or the accumulated retransmission is performed according to the indicator included in the RRC message of the BS is described below.

When a higher layer device (for example, an RRC layer device) makes a request for the PDCP reestablishment procedure, the transmission PDCP layer device performs the following procedure.

1. The transmission PDPC layer device initiates a header compression protocol and starts an unidirectional (U) mode in an initialization and refresh (IR) state if there is no indicator indicating the continuous use of a header compression protocol for UM DRBs and AM DRBs.

2. The transmission PDPC layer device sets window state parameters (for example, TX_NEXT) for UM DRBs and SRBs as initial as initial values.

3. The transmission PDPC layer device discards all stored data (for example, PDCP SDUs or PDCP PDUs) for SRBs (since the data is RRC messages generated to be transmitted to the source BS, the data is discarded not to be transmitted to the target BS).

4. The transmission PDPC layer device applies a new security key received from a higher layer device (for example, an RRC layer device) and an encryption algorithm.

5. Apply a new security key received from a higher layer device (for example, an RRC layer device) and an integrity protection algorithm.

6. For UM DRBs, the transmission PDPC layer device considers data (for example, PDCP SDUs) which has already received PDCP serial numbers but has not yet been transmitted to a lower layer device as data received from a higher layer (for example, an SDAP layer device or a TCP/IP layer device) and transmits the data in an ascending order of COUNT values (or PDCP serial numbers) allocated before PDCP reestablishment. A data discard timer is not restarted. Specifically, the transmission PDPC layer device performs a header compression procedure for the data, performs an integrity procedure or an encryption procedure again, configures a PDCP header, and transmits the same to the lower layer device.

7. If an indicator indicating accumulated retransmission for AM DRBs is configured by an RRC message, A. The transmission PDCP layer device retransmits or transmits all of data, of which successful transmission from lower devices (for example, RLC layer devices) is not identified, starting from the first data (for example, a PDCP SDU) in an ascending order of COUNT values (or PDCP serial numbers) allocated before PDCP reestablishment. That is, the accumulated retransmission is performed from the first data of which successful transmission is not identified. Specifically, a header compression procedure is performed for the data, an integrity procedure or an encryption procedure is performed again, and a PDCP header is configured and transmitted to the lower layer device.

8. If an indicator indicating selective retransmission for AM DRBs is configured by an RRC message, A. The transmission PDCP layer device retransmits or transmits only data, of which successful transmission from lower devices (for example, RLC layer devices) is not identified in an ascending order of COUNT values (or PDCP serial numbers) allocated before PDCP reestablishment. That is, the selective retransmission is performed only for data of which successful transmission is not identified. Specifically, a header compression procedure is performed for the data, an integrity procedure or an encryption procedure is performed again, and a PDCP header is configured and transmitted to the lower layer device.

When the higher layer device (for example, the RRC layer device) makes a request for the PDCP reestablishment procedure, the reception PDCP layer device performs the following procedure.

1. 1. The reception PDCP layer device processes data (for example, PDCP PDUs) received due to reestablishment of lower layer devices (for example, RLC layer devices).

2. The reception PDCP layer device discards all stored data (for example, PDCP SDUs or PDCP PDUs) for SRBs (the data is discarded since the data is RRC messages received from the source BS).

3. If a rearrangement timer runs for SRBs and UM DRBs, the reception PDPC layer device stops and resets the timer, performs a header decompression procedure for all stored data (for example, PDCP SDUs) for UM DRBs and transmits the data to the higher layer device.

4. If there is no indicator indicating the continuous use of a header decompression protocol for AM DRBs, the reception PDCP layer device performs a header decompression procedure for stored data (for example, PDCP SDUs).

5. If there is no indicator indicating the continuous use of a header decompression protocol for UM DRBs and AM DRBs, the reception PDCP layer device initiates a downlink header decompression protocol and starts in a unidirectional (U) mode of a no context (NC) state.

6. The reception PDPC layer device sets window parameters (for example, RX_NEXT and RX_DELIV) for UM DRBs and SRBs as initial values.

7. The reception PDCP layer device applies a new security key received from a higher layer device (for example, an RRC layer device) and an encryption/decryption algorithm.

8. Apply a new security key received from a higher layer device (for example, an RRC layer device) and an integrity protection/verification algorithm.

Figure 1G:
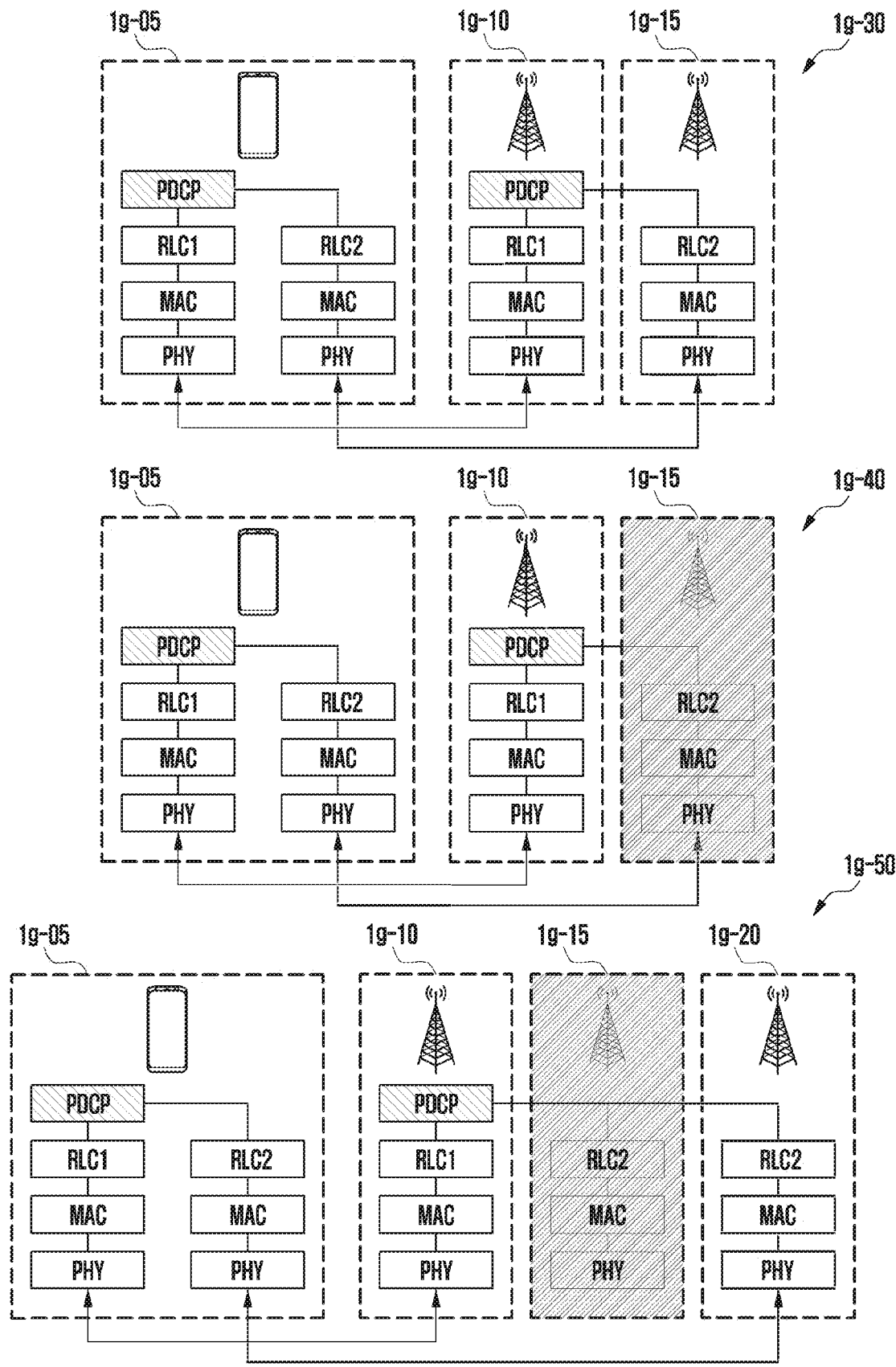
FIG. 1G conceptually illustrates a procedure of changing or releasing one BS of a split bearer or one radio access technology for a UE using the split bearer through two BSs or two radio access technologies in a next-generation mobile communication system according to an embodiment of the disclosure.

FIG. 1G conceptually illustrates a procedure of changing or releasing one BS of a split bearer or one radio access technology for a UE using the split bearer through two BSs or two radio access technologies in a next-generation mobile communication system according to an embodiment of the disclosure.

In FIG. 1G, a UE 1g-05 may transmit and receive data through a split bearer using two BSs (master cell groups (MCGs) 1g-10 and secondary cell group (SCG) 1g-15) or two radio access technologies (licensed band and unlicensed band) as indicated by reference numeral 1g-30.

In the split bearer, the BS may release one BS or one unlicensed band (for example, release a BS 1g-15 as indicated by reference numeral 1g-40) or change to another BS 1g-20 or another unlicensed band (for example, change the BS 1g-15 to the BS 1g-20 as indicated by reference numeral 1g-50) as necessary.

In the procedure, the UE 1g-05 may release or change the connection for data transmission and reception through one BS or one unlicensed in the split bearer. In this case, the data transmitted and received through the connection may be lost. Accordingly, in the above case, the BS 1g-10 may instruct the UE 1g-05 to perform a PDCP data recovery procedure for the split bearer.

Embodiment 1-2 for detailed description of the PDCP data recovery procedure of the bearer of the UE will be described below.

1. If a higher layer device (for example, an RRC layer device) makes a request for a PDCP data recovery procedure for AM DRBs, a transmission PDCP layer device performs the following procedure.

A. The transmission PDCP layer device retransmits only all of data of which successful transmission (RLC ACK) from lower layer devices (for example, RLC layer devices) is not identified among data (for example, PDCP PDUs) previously transmitted to a reestablished AM mode RLC layer device or a disconnected AM mode RLC layer device in an ascending order of COUNT values (or PDCP serial numbers).

Figure 1H:
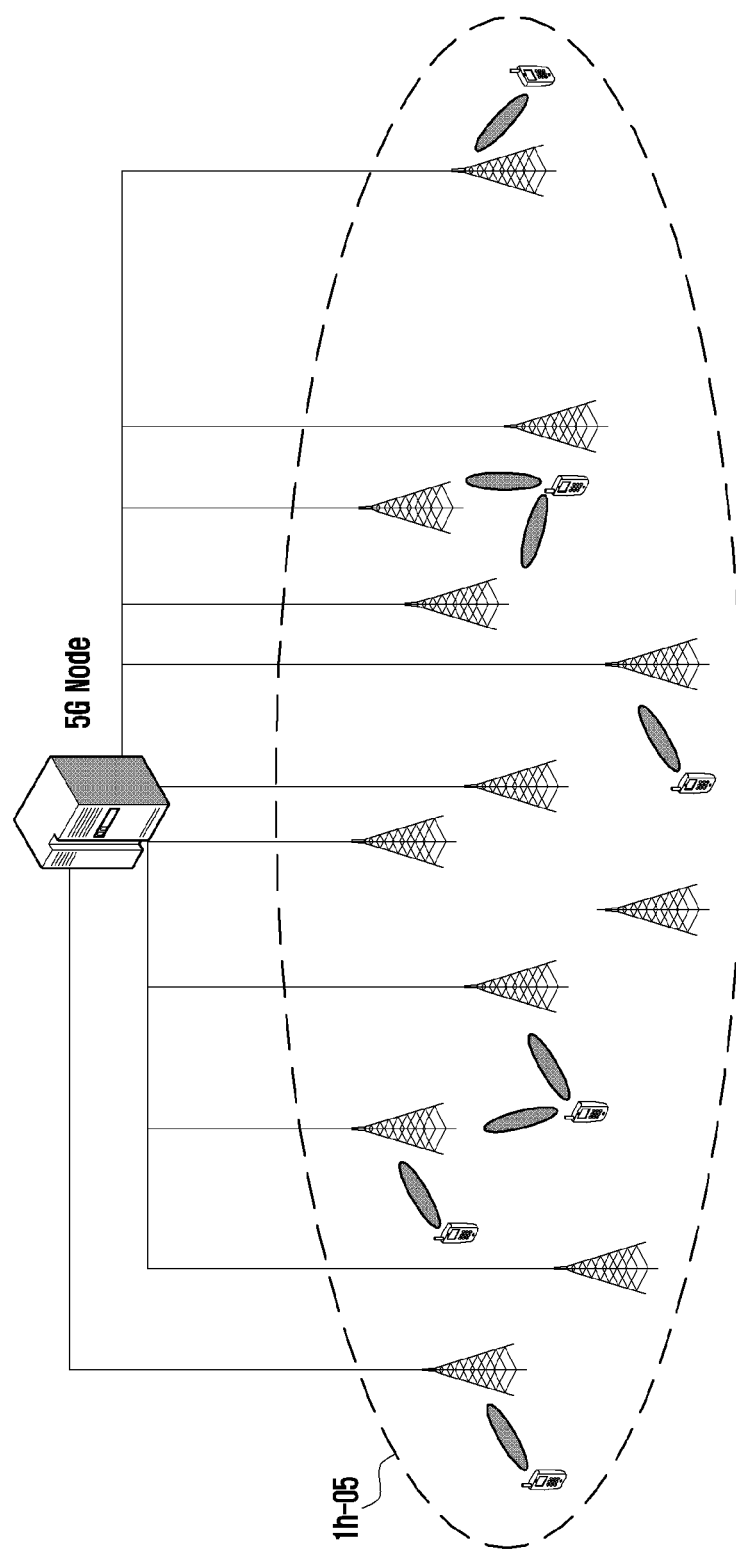
FIGS. 1HA, 1HB, and 1HC illustrate a structure of a BS which can be implemented in a next-generation mobile communication system according to an embodiment of the disclosure.
Figure 1H:
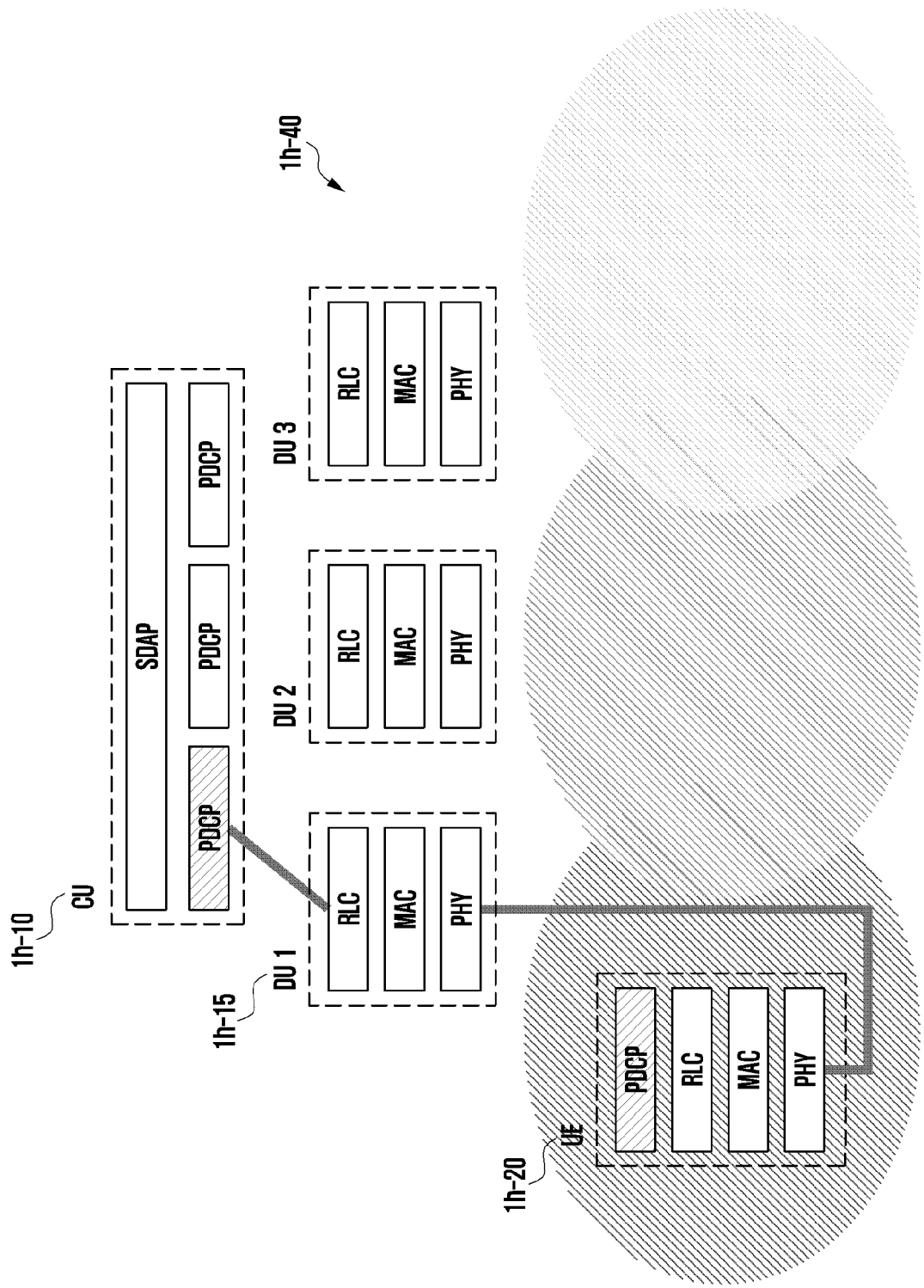
Figure 1H:
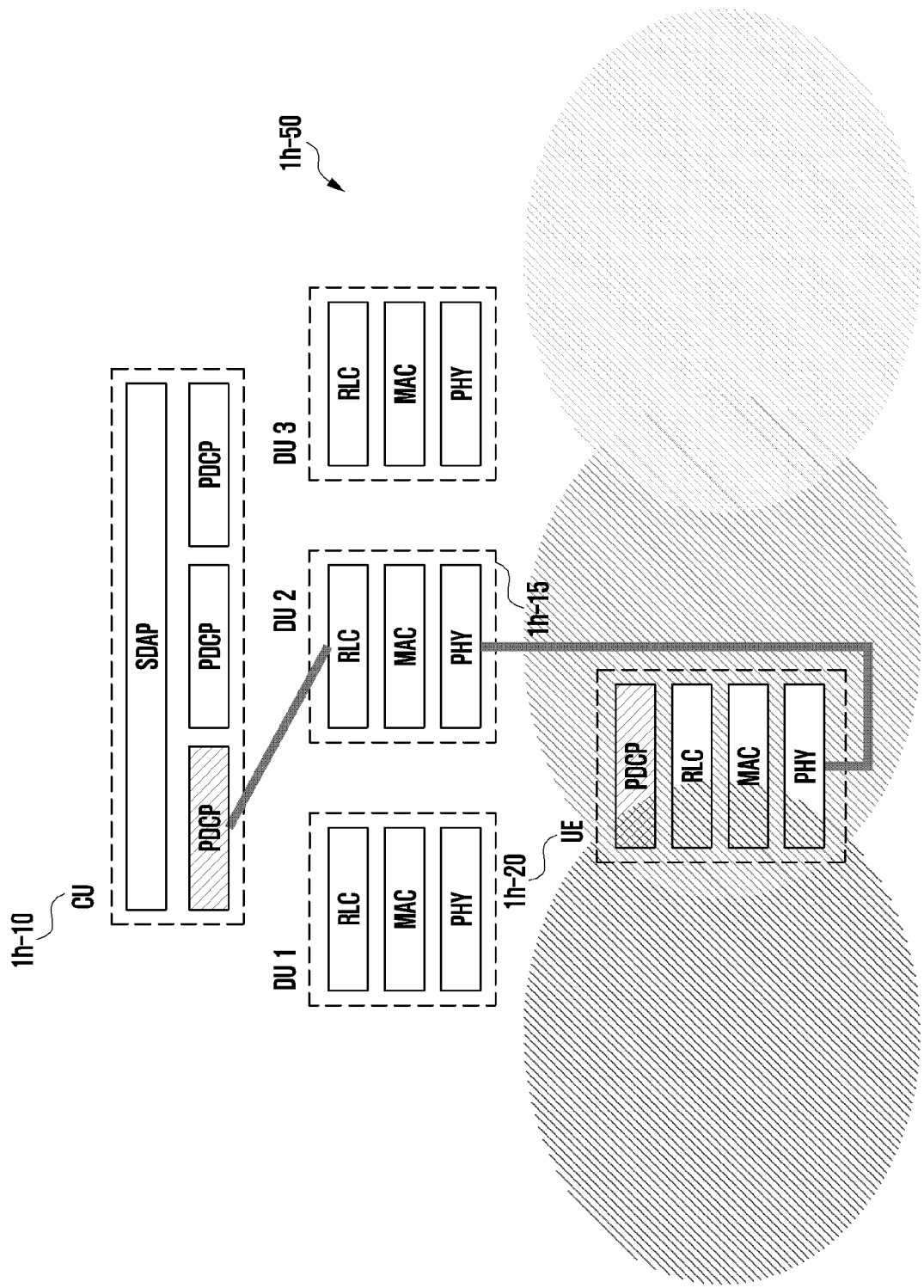

FIG. 1H illustrates a structure of a BS which may be implemented in a next-generation mobile communication system according to an embodiment of the disclosure.

In FIG. 1H, a very wide area may be served by one BS (5G node) in the next-generation mobile communication system as indicated by reference numeral 1h-05. Specifically, there may be a CU-DU split structure which, referring to reference numeral 1h-40 and reference numeral 1h-50, may be implemented by a central unit (CU) in which higher layer devices (for example, a TCP/IP layer device, an SDAP layer device, or a PDCP layer device) 1h-10 operate as indicated by reference numeral 1h-10 and a plurality of distributed units (DUs) 1h-15, 1h-30, . . . in which lower layer devices (for example, an RLC layer device, a MAC layer device, or a PHY layer device) operate as indicated by reference numeral 1h-15 and reference numeral 1h-30 in the protocol structure. One CU 1h-10 and a plurality of DUs 1h-15, 1h-30, . . . may be wiredly or wirelessly connected.

A UE 1h-20 may establish a connection to one DU 1h-15 and transmit and receive data in a large cell served by a BS having the above structure as indicated by reference numeral 1h-40. As indicated by reference numeral 1h-50, a handover to another DU 1h-30 within the BS may be performed due to movement of the UE. It should be noted that the handover within one BS in the above-described CU-DU split structure is performed within an area served by the CU 1h-10 without any change in the CU 1h-10 (that is, the same CU 1h-10), and thus a PDCP layer device of the UE 1h-20 transmitting and receiving data for each bearer and PDCP layer devices of the BS are not changed. That is, unlike the handover illustrated in FIG. 1F, since the PDCP layer device of the BS is not changed and the handover is performed in the same node, a security key is not needed to be updated. Accordingly, the BS may instruct the UE 1h-20 to perform a handover without any update of the security key. It is because, if the security key is not updated, PDCP layer devices of each bearer do not need to update an encryption and decryption algorithm and an integrity protection and verification algorithm through a new security key and stored data is not need to be processed again, so that a transmission delay may be reduced.

However, data loss may be caused while the UE performs the handover, and thus a PDCP data recovery procedure is required.

Hereinafter, the disclosure proposes a PDCP data recovery procedure performed by the UE when the BS instructs the UE to perform the handover without any update of the security key.

Embodiment 1-3-1 of the PDCP data recovery procedure proposed by the disclosure is described below. In Embodiment 1-3-1, the data recovery procedure is performed for SRBs, and an indicator indicating continuous maintenance of a robust header compression (ROHC) protocol is considered.

When a higher layer device (for example, an RRC layer device) makes a request for a PDCP data recovery procedure, a transmission PDCP layer device may perform one or a plurality of operations among the following procedures.

1. The transmission PDPC layer device initiates a header compression protocol and start an unidirectional (U) mode in an initialization and refresh (IR) state if there is no indicator indicating the continuous use of a header compression protocol for UM DRBs and AM DRBs.

2. The transmission PDPC layer device sets window state parameters (for example, TX_NEXT) for UM DRBs and SRBs as initial as initial values.

3. For UM DRBs, the transmission PDPC layer device transmits data in an ascending order of COUNT values (or PDCP serial numbers) for data (for example, PDCP SDUs) which has PDCP serial numbers allocated thereto but which has not yet been transmitted to a lower layer device. A data discard timer is not restarted. If there is no indication indicating the continuous use of the header compression protocol, the transmission PDPC layer device performs again the header compression procedure for the data, performs again the integrity procedure or encryption procedure, configures a PDCP header, and transmits the same to a lower layer device.

4. For AM DRBs, the transmission PDPC layer device retransmits or transmits only data (for example, PDCP SUD) of which successful transmission from lower layers (for example, RLC layer devices) is not identified among data (for example, PDCP PDUs) which has been previously transmitted to a reestablished AM mode RLC layer device or a disconnected AM mode RLC layer device in an ascending order of COUNT values (or PDCP serial numbers). That is, the selective retransmission is performed only for data of which successful transmission is not identified. If there is no indication indicating the continuous use of the header compression protocol, the transmission PDCP layer device performs the header compression procedure for the data again, performs the integrity procedure or the encryption procedure again, configures a PDCP header, and transmits the same to a lower layer device.

5. For SRBs, the transmission PDPC layer device retransmits or transmits only data (for example, PDCP SDU) of which successful transmission from lower layers (for example, RLC layer devices) is not identified among data (for example, PDCP PDUs) which has been previously transmitted to a reestablished AM mode RLC layer device or a disconnected AM mode RLC layer device in an ascending order of COUNT values (or PDCP serial numbers). That is, the selective retransmission is performed only for data of which successful transmission is not identified (since the data is data configured for the same BS or CU, retransmission is performed).

When a higher layer device (for example, an RRC layer device) makes a request for a PDCP data recovery procedure, a reception PDCP layer device may perform one or a plurality of operations among the following procedures.

1. The reception PDCP layer device processes data (for example, PDCP PDUs) received due to reestablishment of lower layer devices (for example, RLC layer devices).

2. For SRBs, the reception PDCP layer device processes and receives all stored data (for example, PDCP SDUs or PDCP PDUs) (since the data is RRC messages received from the same BS or CU, the data is processed and received).

3. If a rearrangement timer runs for SRBs and UM DRBs, the reception PDPC layer device stops and resets the timer, performs a header decompression procedure for all stored data (for example, PDCP SDUs) for UM DRBs and transmits the data to the higher layer device.

4. If there is no indicator indicating the continuous use of a header decompression protocol for AM DRBs, the reception PDCP layer device performs a header decompression procedure for stored data (for example, PDCP SDUs).

5. If there is no indicator indicating the continuous use of a header decompression protocol for UM DRBs and AM DRBs, the reception PDCP layer device initiates a downlink header decompression protocol and starts in a unidirectional (U) mode of a no context (NC) state.

6. The reception PDPC layer device sets window parameters (for example, RX_NEXT and RX_DELIV) for UM DRBs and SRBs as initial values.

Embodiment 1-3-2 of the PDCP data recovery procedure according to an embodiment of the disclosure is described below. In Embodiment 1-3-2, the data recovery procedure is performed for SRBs, and an indicator indicating the continuous maintenance of the ROHC protocol is not considered.

When a higher layer device (for example, an RRC layer device) makes a request for a PDCP data recovery procedure, a transmission PDCP layer device may perform one or a plurality of operations among the following procedures.

1. For UM DRBs, the transmission PDCP layer device transmits data in an ascending order of COUNT values (or PDCP serial numbers) for data (for example, PDCP SDUs) which has PDCP serial numbers allocated thereto but has not yet been transmitted to a lower layer device. A data discard timer is not restarted.

2. For AM DRBs, the transmission PDPC layer device retransmits or transmits only data (for example, PDCP SDU) of which successful transmission from lower layers (for example, RLC layer devices) is not identified among data (for example, PDCP PDUs) which has been previously transmitted to a reestablished AM mode RLC layer device or a disconnected AM mode RLC layer device in an ascending order of COUNT values (or PDCP serial numbers). That is, the selective retransmission is performed only for data of which successful transmission is not identified.

3. For SRBs, the transmission PDPC layer device retransmits or transmits only data (for example, PDCP SDU) of which successful transmission from lower layers (for example, RLC layer devices) is not identified among data (for example, PDCP PDUs) which has been previously transmitted to a reestablished AM mode RLC layer device or a disconnected AM mode RLC layer device in an ascending order of COUNT values (or PDCP serial numbers). That is, the selective retransmission is performed only for data of which successful transmission is not identified (since the data is data configured for the same BS or CU, retransmission is performed).

When a higher layer device (for example, an RRC layer device) makes a request for a PDCP data recovery procedure, a reception PDCP layer device may perform one or a plurality of operations among the following procedures.

1. 1. The reception PDCP layer device processes data (for example, PDCP PDUs) received due to reestablishment of lower layer devices (for example, RLC layer devices).

2. For SRBs, the reception PDCP layer device processes and receives all stored data (for example, PDCP SDUs or PDCP PDUs) (since the data is RRC messages received from the same BS or CU, the data is processed and received).

3. If a rearrangement timer runs for SRBs and UM DRBs, the reception PDPC layer device stops and resets the timer, performs a header decompression procedure for all stored data (for example, PDCP SDUs) for UM DRBs and transmits the data to the higher layer device.

Embodiment 1-3-3 of the PDCP data recovery procedure according to an embodiment of the disclosure is described below. In Embodiment 1-3-3, the data recovery procedure is not performed for SRBs.

When a higher layer device (for example, an RRC layer device) makes a request for a PDCP data recovery procedure, a transmission PDCP layer device may perform one or a plurality of operations among the following procedures.

1. The transmission PDPC layer device initiates a header compression protocol and starts an unidirectional (U) mode in an initialization and refresh (IR) state if there is no indicator indicating the continuous use of a header compression protocol for UM DRBs and AM DRBs.

2. The transmission PDCP layer device sets window state parameters (for example, TX_NEXT) for UM DRBs and SRBs as initial as initial values.

3. The transmission PDCP layer device discards all stored data (for example, PDCP SDUs or PDCP PDUs) for SRBs. (the lost RRC message is discarded to instruct the RRC layer device to perform retransmission by the BS).

4. For UM DRBs, the transmission PDCP layer device considers data (for example, PDCP SDUs) which has already received PDCP serial numbers but has not yet been transmitted to a lower layer device as data received from a higher layer (for example, an SDAP layer device or a TCP/IP layer device) and transmits the data in an ascending order of COUNT values (or PDCP serial numbers) allocated before PDCP reestablishment. A data discard timer is not restarted. Specifically, the transmission PDCP layer device performs a header compression procedure for the data, performs an integrity procedure or an encryption procedure again, configures a PDCP header, and transmits the same to the lower layer device.

5. For UM DRBs, the transmission PDCP layer device transmits data in an ascending order of COUNT values (or PDCP serial numbers) for data (for example, PDCP SDUs) which has PDCP serial numbers allocated thereto but which has not yet been transmitted to a lower layer device. A data discard timer is not restarted. If there is no indication indicating the continuous use of the header compression protocol, the transmission PDCP layer device performs the header compression procedure for the data again, performs the integrity procedure or the encryption procedure again, configures a PDCP header, and transmits the same to a lower layer device.

6. For AM DRBs, the transmission PDPC layer device retransmits or transmits only data (for example, PDCP SDU) of which successful transmission from lower layers (for example, RLC layer devices) is not identified among data (for example, PDCP PDUs) which has been previously transmitted to a reestablished AM mode RLC layer device or a disconnected AM mode RLC layer device in an ascending order of COUNT values (or PDCP serial numbers). That is, the selective retransmission is performed only for data of which successful transmission is not identified. If there is no indication indicating the continuous use of the header compression protocol, the transmission PDCP layer device performs the header compression procedure for the data again, performs the integrity procedure or the encryption procedure again, configures a PDCP header, and transmits the same to a lower layer device.

When a higher layer device (for example, an RRC layer device) makes a request for a PDCP data recovery procedure, a reception PDCP layer device may perform one or a plurality of operations among the following procedures.

1. 1. The reception PDCP layer device processes data (for example, PDCP PDUs) received due to reestablishment of lower layer devices (for example, RLC layer devices).

2. The reception PDCP layer device discards all stored data (for example, PDCP SDUs or PDCP PDUs) for SRBs (the data is discarded since the data is RRC messages received from the BS long time ago).

3. If a rearrangement timer runs for SRBs and UM DRBs, the reception PDPC layer device stops and resets the timer, performs a header decompression procedure for all stored data (for example, PDCP SDUs) for UM DRBs and transmits the data to the higher layer device.

4. If there is no indicator indicating the continuous use of a header decompression protocol for AM DRBs, the reception PDCP layer device performs a header decompression procedure for stored data (for example, PDCP SDUs).

5. If there is no indicator indicating the continuous use of a header decompression protocol for UM DRBs and AM DRBs, the reception PDCP layer device initiates a downlink header decompression protocol and starts in a unidirectional (U) mode of a no context (NC) state.

6. The reception PDPC layer device sets window parameters (for example, RX_NEXT and RX_DELIV) for UM DRBs and SRBs as initial values.

Embodiment 1-3-4 of the PDCP data recovery procedure proposed by the disclosure is described below. In Embodiment 1-3-4, different PDCP data recovery procedures are performed according to an indication of the BS.

The UE may receive an RRCReconfiguration message including reconfigurationWithSync and srb-ToAddModList from the BS, and a PDCP data recovery procedure is applied for already configured SRBs among SRBs specified in SRB-ToAddMod of the message.

1. If SRB-ToAddMod includes an indication (reestablishPDCP) indicating reestablishment of a PDPC layer device, Embodiment 1-1-1 or Embodiment 1-1-2 of the disclosure is performed.

2. If SRB-ToAddMod includes an indication (recoverPDCP) indicating recovery of a PDPC layer device, Embodiment 1-3-1 or Embodiment 1-3-2 of the disclosure is performed.

3. If SRB-ToAddMod includes an indication (discardOnPDCP) indicating discard of data of a PDCP layer device, Embodiment 1-3-3 of the disclosure is performed.

When the procedure is completed, an RRCReconfigurationComplete message is transmitted to the BS.

In Embodiment 1-3-1, Embodiment 1-3-2, or Embodiment 1-3-3 of the PDCP data recovery procedure of the disclosure, the procedure for SRBs may be performed by the BS only when the BS transmits an indication through a newly defined indicator in an RRC message.

Hereinafter, the disclosure proposes a procedure in which an RRC layer device of the UE retransmits an RRC message when the BS instructs the UE to perform a handover with an update of a security key or a handover without any update of a security key. When the UE performs a handover, RRC messages transmitted before a handover command are not retransmitted, and thus the RRC messages may be lost. Accordingly, the BS does not successfully receive RRC messages from the UE, the BS may transmits an RRC message including an indicator indicating retransmission of specific RRC messages so as to make a request for retransmitting the specific RRC messages to the UE.

Embodiment 1-4-1 in which the BS makes a request for retransmitting an RRC message to the UE according to an embodiment of the disclosure is described below. In Embodiment 1-4-1, the BS makes a request for retransmitting specific RRC messages to an RRC layer device of the UE through one indicator.

1. The BS and the UE may define specific RRC message types which can be retransmitted. The specific RRC messages may be RRC messages which should be transmitted when a specific function is configured in the UE. For example, in the case of a UE in which power preference indications, UE overheating assistance information, SPS assistance information, a delay budget report, and maximum bandwidth preference indications are configured, RRC messages which should be transmitted according to the configuration may be defined as specific RRC messages which should be retransmitted.

2. The BS may transmit an RRC message to the UE and define a new indicator to make a request for retransmit specific RRC messages.

3. When the indicator making a request for retransmitting specific RRC messages is included in RRC messages received from the BS, an RRC layer device of the UE may retransmit all of the defined specific RRC messages which can be retransmitted. That is, the RRC messages may be transmitted to a lower layer device (for example, a PDCP layer device).

4. Time points at which the specific RRC messages are retransmitted may be one or a plurality of the following conditions.

A. A time point at which an RRC message indicating an indicator making a request for retransmitting a specific RRC message is received from the BS B. A time point at which specific system information of a BS or a cell performing a handover is received C. When an RRC message including an indicator making a request for retransmitting a specific RRC message is received from the BS and a predetermined condition defined by the BS is satisfied, only RRC messages transmitted within a preset time (for example, last one second) before an RRC message (for example, an RRCReconfiguration message or a handover indication message) is received may be retransmitted. For example, only RRC messages transmitted during the last one second before an RRC message including specific information is received may be retransmitted (during the last 1 second preceding reception of the RRCConnectionReconfiguration message including mobilityControlInfo).

Embodiment 1-4-2 in which the BS makes a request for retransmitting an RRC message to the UE according to an embodiment of the disclosure is described below. In Embodiment 1-4-2, the BS defines and makes a request for a retransmission request indicator for each RRC message to make an RRC layer device of the UE retransmit specific RRC messages.

1. The BS and the UE may define specific RRC message types which can be retransmitted. The specific RRC messages may be RRC messages which should be transmitted when a specific function is configured in the UE. For example, in the case of a UE in which power preference indications, UE overheating assistance information, SPS assistance information, a delay budget report, and maximum bandwidth preference indications are configured, RRC messages which should be transmitted according to the configuration may be defined as specific RRC messages which should be retransmitted.

2. The BS may transmit an RRC message to the UE and define a new indicator for each RRC message to make a request for retransmitting specific RRC messages.

3. When indicators making a request for retransmitting specific RRC messages are included in RRC messages received from the BS, an RRC layer device of the UE may retransmit the defined specific RRC messages which can be retransmitted if the retransmission is indicated by an indicator. That is, the RRC messages may be transmitted to a lower layer device (for example, a PDCP layer device).

4. Time points at which the specific RRC messages are retransmitted may be one or a plurality of the following conditions.

A. A time point at which an RRC message indicating an indicator making a request for retransmitting a specific RRC message is received from the BS B. A time point at which specific system information of a BS or a cell performing a handover is received C. When an RRC message including an indicator making a request for retransmitting a specific RRC message is received from the BS and a predetermined condition defined by the BS is satisfied, only RRC messages transmitted within the last one second before an RRC message (for example, an RRCReconfiguration message or a handover indication message) is received may be retransmitted. For example, only RRC messages transmitted during the last one second before an RRC message including specific information is received may be retransmitted (during the last 1 second preceding reception of the RRCConnectionReconfiguration message including mobilityControlInfo).

Embodiment 1-4-3 in which the BS makes a request for retransmitting an RRC message to the UE according to an embodiment of the disclosure is described below. In Embodiment 1-4-3, a new retransmission request indicator is defined and requested to make an RRC layer device of the UE retransmit all RRC messages transmitted for the last one second before the UE receives an RRC message including specific information.

1. The BS may transmit an RRC message to the UE and define a new indicator to make a request for retransmitting specific RRC messages. The specific RRC messages may be all RRC messages transmitted for the last one second before the UE receives an RRC message including specific information.

2. When an indicator making a request for retransmitting specific RRC messages is included in RRC messages received by the UE from the BS, an RRC layer device of the UE may retransmit the specific RRC messages. That is, the RRC messages may be transmitted to a lower layer device (for example, a PDCP layer device).

3. Time points at which the specific RRC messages are retransmitted may be one or a plurality of the following conditions.

A. A time point at which an RRC message indicating an indicator making a request for retransmitting a specific RRC message is received from the BS B. A time point at which specific system information of a BS or a cell performing a handover is received C. When an RRC message including an indicator making a request for retransmitting a specific RRC message is received from the BS and a predetermined condition defined by the BS is satisfied, only RRC messages transmitted within the last one second before an RRC message (for example, an RRCReconfiguration message or a handover indication message) is received may be retransmitted. For example, only RRC messages transmitted during the last one second before an RRC message including specific information is received may be retransmitted (during the last 1 second preceding reception of the RRCConnectionReconfiguration message including mobilityControlInfo).

The PDCP data recovery procedures, the PDCP data recovery procedure for the SRB, or the RRC message retransmission procedures for retransmission by the RRC layer device, proposed by the disclosure, may be or may not be supported by UE capability and thus may be defined as one function of the UE capability, and whether the UE supports the function, which is the UE capability, may be reported to the BS.

Further, the UE may identify whether the procedure is supported by the BS through system information of the BS or the cell which the UE accesses.

Figure 1I:
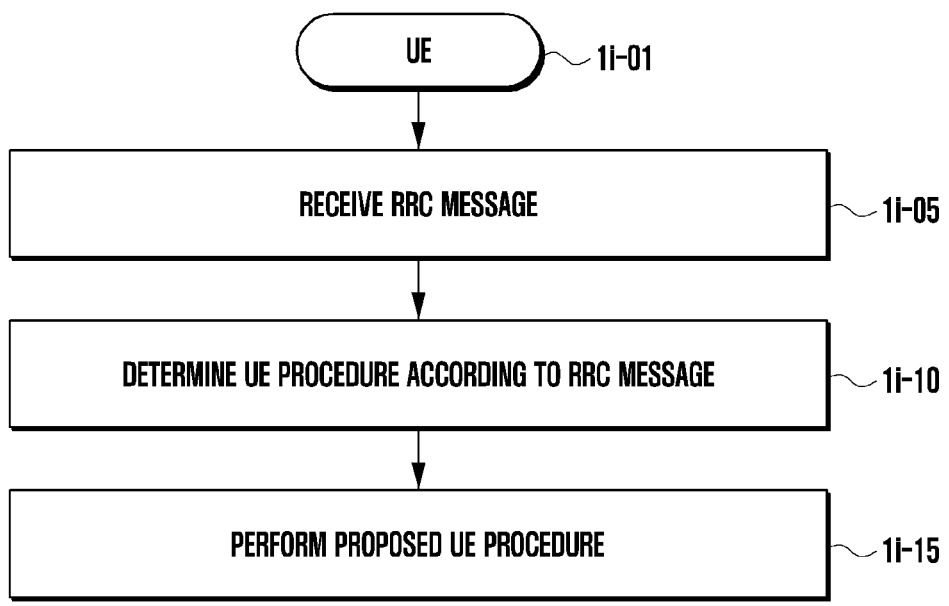
FIG. 1I illustrates a UE operation according to an embodiment of the disclosure.

FIG. 1I illustrates a UE operation according to an embodiment of the disclosure.

In FIG. 1I, when receiving RRC messages from the BS in step 1$i$-05, a UE 1$i$-01 identifies information and indications included in the RRC messages, determines which procedure will be performed according to the RRC messages among the proposed embodiments of the disclosure, in step 1$i$-10, and performs a procedure proposed by the disclosure in step 1$i$-15.

Figure 1J:
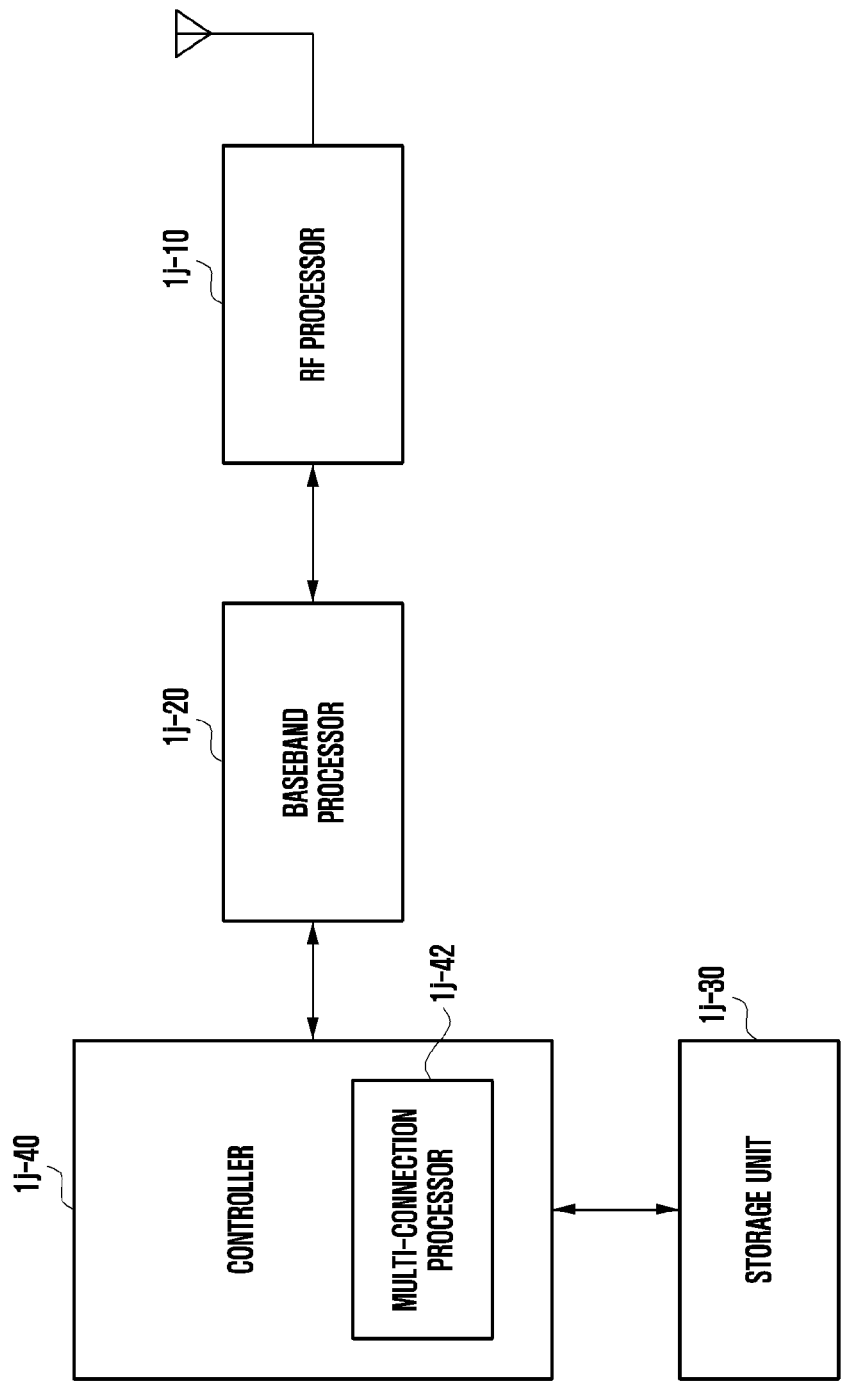
FIG. 1J illustrates a configuration of a UE according to an embodiment of the disclosure.

FIG. 1J illustrates a configuration of a UE according to an embodiment of the disclosure.

Referring to FIG. 1J, the UE includes a radio-frequency (RF) processor 1$j$-10, a baseband processor 1$j$-20, a storage unit 1$j$-30, and a controller 1$j$-40. The controller 1$j$-40 may include a multi-connection processor 1$j$-42.

The RF processor 1$j$-10 performs a function for transmitting and receiving a signal through a radio channel, such as band conversion and amplification of a signal. That is, the RF processor 1$j$-10 up-converts a baseband signal provided from the baseband processor 1$j$-20 into an RF band signal, transmits the RF band signal through an antenna, and then down-converts the RF band signal received through the antenna into a baseband signal. For example, the RF processor 1$j$-10 may include a transmission filter, a reception filter, an amplifier, a mixer, an oscillator, a digital-to-analog convertor (DAC), an analog-to-digital convertor (ADC), and the like. Although FIG. 2J illustrates only one antenna, the UE may include a plurality of antennas. Further, the RF processor 1$j$-10 may include a plurality of RF chains. In addition, the RF processor 1$j$-10 may perform beamforming. For the beamforming, the RF processor 1$j$-10 may control the phase and size of each signal transmitted/received through a plurality of antennas or antenna elements. The RF processor may perform MIMO and receive a plurality of layers when performing the MIMO operation. The RF processor 1$j$-10 may perform reception beam sweeping by properly configuring a plurality antennas or antenna elements according to the control of the controller or may adjust a direction of a reception beam and a beam width such that the reception beam cooperates with a transmission beam.

The baseband processor 1$j$-20 performs a function for conversion between a baseband signal and a bitstream according to a physical layer standard of the system. For example, in data transmission, the baseband processor 1$j$-20 generates complex symbols by encoding and modulating a transmission bitstream. Further, in data reception, the baseband processor 1$j$-20 reconstructs a reception bitstream by demodulating and decoding a baseband signal provided from the RF processor 1$j$-10. For example, in an orthogonal frequency division multiplexing (OFDM) scheme, when data is transmitted, the baseband processor 1$j$-20 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processor 1$j$-20 divides the baseband signal provided from the RF processor 1$j$-10 in units of OFDM symbols, reconstructs the signals mapped to the subcarriers through a fast Fourier transform (FFT) operation, and then reconstructs a reception bitstream through demodulation and decoding.

The baseband processor 1$j$-20 and the RF processor 1$j$-10 transmit and receive signals as described above. Accordingly, each of the baseband processor 1$j$-20 and the RF processor 1$j$-10 may be referred to as a transmitter, a receiver, a transceiver, or a communication unit. At least one of the baseband processor 1$j$-20 and the RF processor 1$j$-10 may include a plurality of communication modules to support a plurality of different radio access technologies. At least one of the baseband processor 1$j$-20 and the RF processor 1$j$-10 may include different communication modules to process signals in different frequency bands. For example, the different radio access technologies may include an LTE network and an NR network. Further, the different frequency bands may include a super high frequency (SHF) (for example, 2.2 gHz and 2 ghz) band and a millimeter (mm) wave (for example, 60 GHz) band.

The storage unit 1$j$-30 stores data such as a basic program, an application, and configuration information for the operation of the UE. The storage unit 1$j$-30 provides stored data according to a request from the controller 1$j$-40.

The controller 1$j$-40 controls the overall operation of the UE. For example, the controller 1$j$-40 transmits and receives signals through the baseband processor 1$j$-20 and the RF processor 1$j$-10. Further, the controller 1$j$-40 records data in the storage unit 1$j$-30 and reads the data. To this end, the controller 1$j$-40 may include at least one processor. For example, the controller 1$j$-40 may include a communications processor (CP) that performs control for communication, and an application processor (AP) that controls higher layers such as an application layer.

Figure 1K:
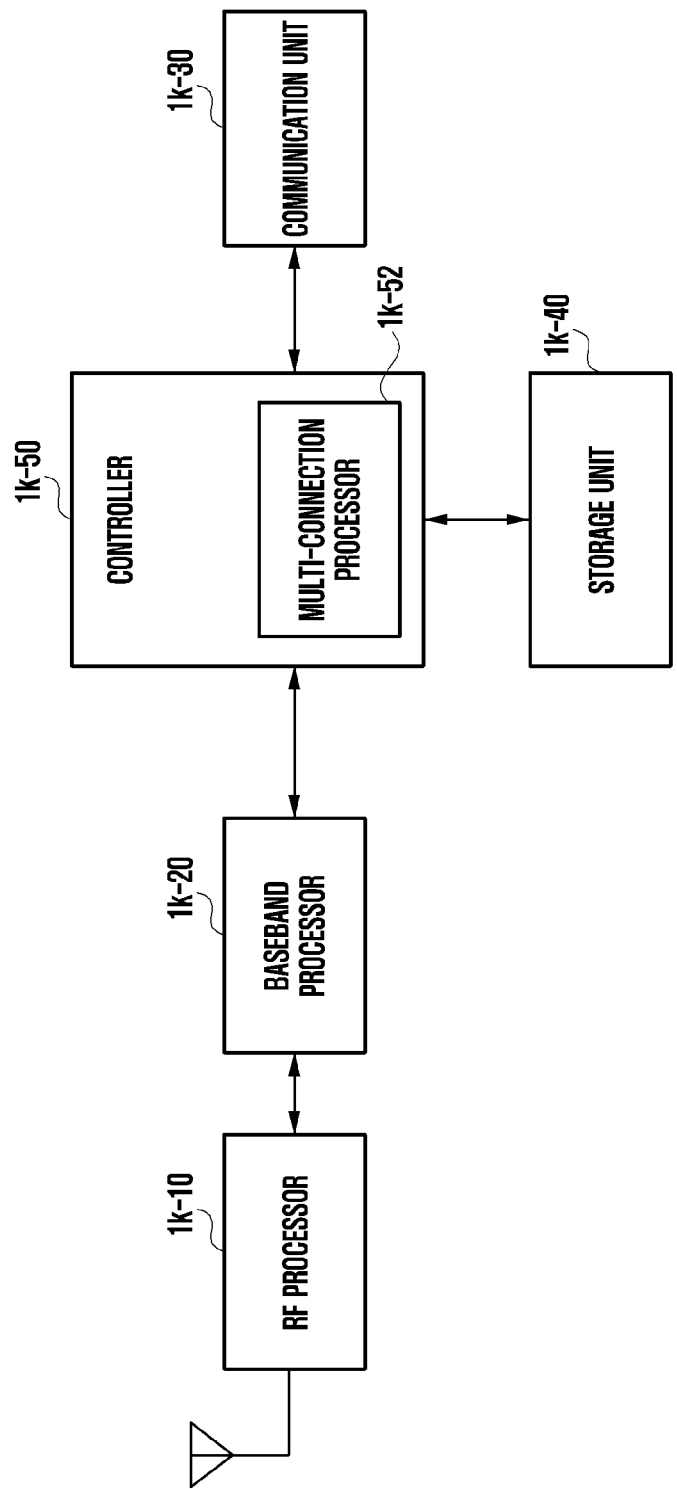
FIG. 1K illustrates a configuration of a BS according to an embodiment of the disclosure.

FIG. 1K illustrates a BS according to an embodiment of the disclosure.

As illustrated in FIG. 1K, the BS includes an RF processor 1$k$-10, a baseband processor 1$k$-20, a backhaul communication unit 1$k$-30, a storage unit 1$k$-40, and a controller 1$k$-50. The controller 1$k$-50 may include a multi-connection processor 1$k$-52.

The RF processor 1$k$-10 performs a function for transmitting and receiving a signal through a wireless channel, such as band conversion and amplification of a signal. That is, the RF processor 1k-10 up-converts a baseband signal provided from the baseband processor 1k-20 into an RF band signal, transmits the converted signal through an antenna, and down-converts an RF band signal received through the antenna into a baseband signal. For example, the RF processor 1k-10 may include a transmission filter, a reception filter, an amplifier, a mixer, an oscillator, a DAC, and an ADC. Although FIG. 1K illustrates only one antenna, the first access node may include a plurality of antennas. Further, the RF processing unit 1k-10 may include a plurality of RF chains. In addition, the RF processor 1k-10 may perform beamforming. For the beamforming, the RF processor 1k-10 may control the phase and the size of each of the signals transmitted and received through a plurality of antennas or antenna elements. The RF processor may perform a downlink MIMO operation by transmitting one or more layers.

The baseband processor 1k-20 performs a function of conversion between a baseband signal and a bitstream according to a physical-layer standard of the first radio access technology. For example, when data is transmitted, the baseband processor 1k-20 generates complex symbols by encoding and modulating a transmission bitstream. Further, when data is received, the baseband processor 1k-20 reconstructs a reception bitstream by demodulating and decoding a baseband signal provided from the RF processor 1k-10. For example, in an OFDM scheme, when data is transmitted, the baseband processor 1k-20 may generate complex symbols by encoding and modulating the transmission bitstream, map the complex symbols to subcarriers, and then configure OFDM symbols through an IFFT operation and CP insertion. In addition, when data is received, the baseband processor 1k-20 divides a baseband signal provided from the RF processor 1k-10 in units of OFDM symbols, recovers signals mapped with subcarriers through an FFT operation, and then recovers a reception bitstream through demodulation and decoding. The baseband processor 1k-20 and the RF processor 1k-10 transmit and receive a signal as described above. Accordingly, each of the baseband processor 1k-20 and the RF processor 1k-10 may be referred to as a transmitter, a receiver, a transceiver, a communication unit, or a wireless communication unit.

The communication unit 1k-30 provides an interface for communicating with other nodes within the network.

The storage unit 1k-40 stores data such as a basic program, an application, and configuration information for the operation of the MeNB. Particularly, the storage unit 1k-40 may store information on a bearer allocated to the accessed UE and the result of measurement reported from the accessed UE The storage unit 1k-40 may store information which is a reference for determining whether to provide multi connections to the UE or stop the connections. The storage unit 1k-40 provides stored data in response to a request from the controller 1k-50.

The controller 1k-50 controls the overall operation of the MeNB. For example, the controller 1k-50 transmits and receives signals through the baseband processor 1k-20 and the RF processor 1k-10 or through the backhaul communication unit 1k-30. Further, the controller 1k-50 records data in the storage unit 1k-40 and reads the data. To this end, the controller 1k-50 may include at least one processor.

Second Embodiment

Figure 2A:
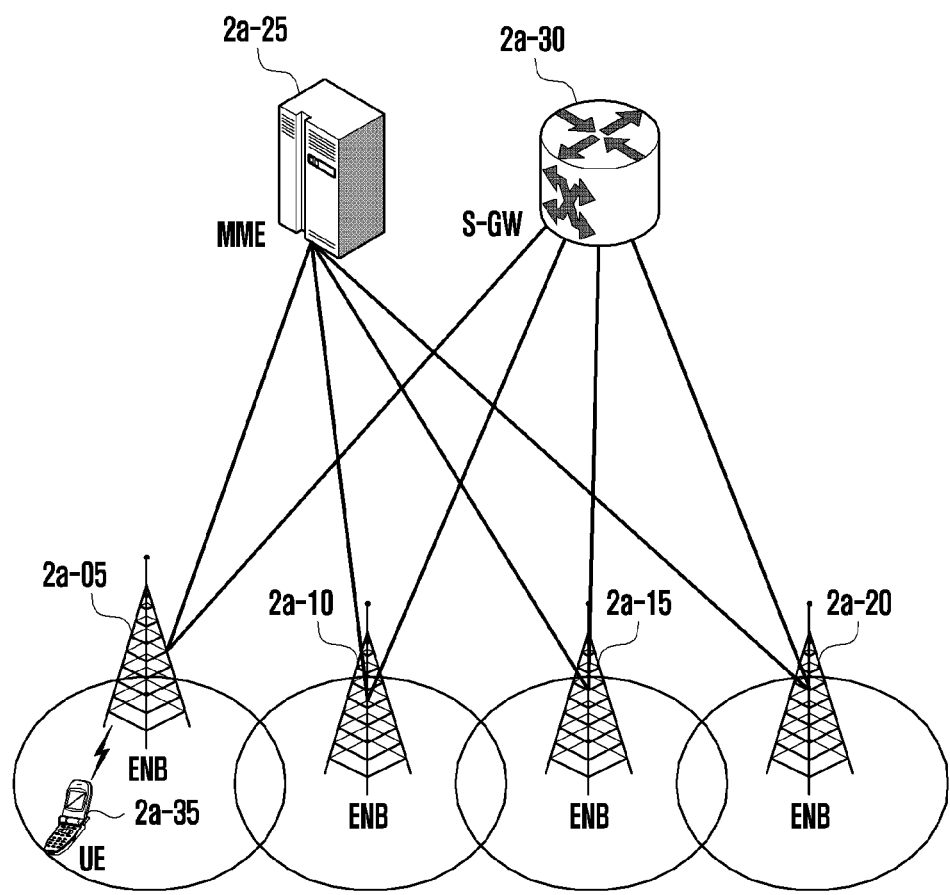
FIG. 2A illustrates a structure of an LTE system according to an embodiment of the disclosure.

FIG. 2A illustrates a structure of an LTE system according to an embodiment of the disclosure.

Referring to FIG. 2A, a radio access network of the LTE system includes next-generation base stations (evolved node Bs (ENBs), Node Bs, or base stations) 2a-05, 2a-10, 2a-15, and 2a-20, a mobility management entity (MME) 2a-25, and a serving gateway (S-GW) 2a-30. A user equipment (UE or terminal) 2a-35 accesses an external network through the ENBs 2a-05, 2a-10, 2a-15, and 2a-20, and the S-GW 2a-30.

In FIG. 2A, the ENBs 2a-05, 2a-10, 2a-15, and 2a-20 correspond to the existing node Bs of the UMTS system. The ENB 2a-05 is connected to the UE 2a-35 through a radio channel, and performs a more complicated role than the conventional node B. In the LTE system, since all user traffic including a real time service such as a VoIP (Voice over IP) through an Internet protocol are serviced through a shared channel, an apparatus for collecting and scheduling status information on buffer statuses of UEs, available transmission power status, and channel statuses is required, and the ENBs 2a-05, 2a-10, 2a-15, and 2a-20 serve as this apparatus. One ENB generally controls a plurality of cells. For, example, in order to implement a transmission rate of 100 Mbps, the LTE system uses orthogonal frequency division multiplexing (OFDM) as a radio access technology in a bandwidth of 20 MHz. Further, an adaptive modulation and coding (AMC) scheme of determining a modulation scheme and a channel coding rate is applied depending on the channel status of the UE. The S-GW 2a-30 is a device for providing a data bearer, and generates or removes the data bearer under a control of the MME 2a-25. The MME 2a-35 is a device which serves to perform not only a function of managing mobility of the UE 2a-35 but also various control functions and is connected to a plurality of ENBs.

Figure 2B:
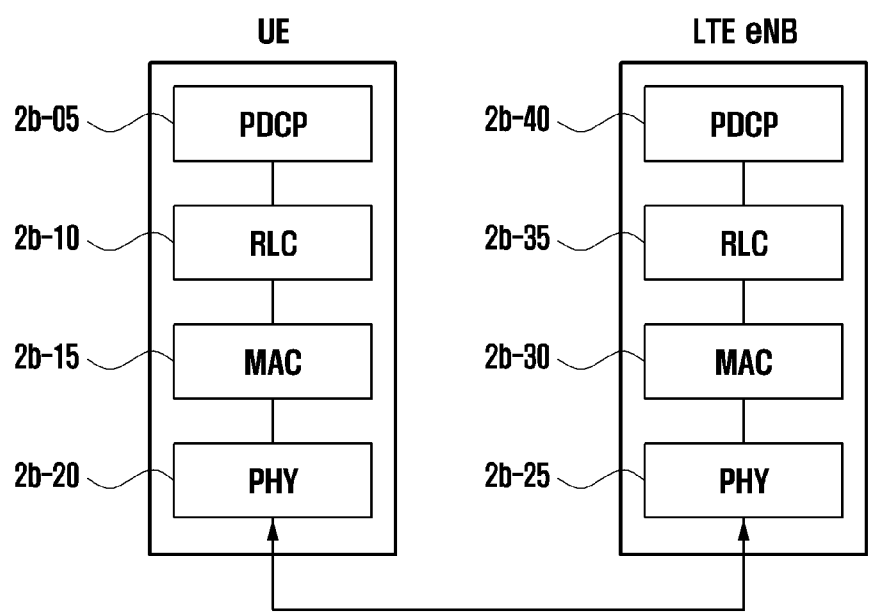
FIG. 2B illustrates a structure of a wireless protocol in the LTE system according to an embodiment of the disclosure.

FIG. 2B illustrates a structure of a wireless protocol in the LTE system according to an embodiment of the disclosure.

Referring to FIG. 2B, the UE and the ENB include packet data convergence protocols (PDCPs) 2b-05 and 2b-40, radio link controls (RLCs) 2b-10 and 2b-35, and medium access controls (MACs) 2b-15 and 2b-30, respectively, in the wireless protocol of the LTE system. The packet data convergence protocols (PDCPs) 2b-05 and 2b-40 performs an operation of compressing/reconstructing an IP header. Main functions of the PDCP are described below.

Header compression and decompression function ((Header compression and decompression: ROHC only)

User data transmission function (Transfer of user data)

Sequential delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU removal function (Timer-based SDU discard in uplink)

Radio link control (RLC) 2*b*-10 and 2*b*-35 reconfigure the PDCP packet data unit (PDU) to be the proper size and perform an ARQ operation. Main functions of the RLC are described below.

> Data transmission function (Transfer of upper layer PDUs)
> ARQ function (Error Correction through ARQ (only for AM data transfer))
> Concatenation, segmentation, and reassembly function (Concatenation, segmentation, and reassembly of RLC SDUs (only for UM and AM data transfer))
> Re-segmentation function (Re-segmentation of RLC data PDUs (only for AM data transfer))
> Reordering function (Reordering of RLC data PDUs (only for UM and AM data transfer)
> Duplication detection function (only for UM and AM data transfer))
> Error detection function (Protocol error detection (only for AM data transfer))
> RLC SDU deletion function (RLC SDU discard (only for UM and AM data transfer))
> RLC re-establishment function (RLC re-establishment)

The MACs 2*b*-15 and 2*b*-30 are connected with various RLC layer devices included in one entity, and perform an operation for multiplexing RLC PDUs to the MAC PDU and demultiplexing the RLC PDUs from the MAC PDU. Main functions of the MAC are described below.

> Mapping function (Mapping between logical channels and transport channels)
> Multiplexing and demultiplexing function (Multiplexing/demultiplexing of MAC SDUs belonging to one or different logical channels into/from transport blocks (TB) delivered to/from the physical layer on transport channels)
> Scheduling information report function (Scheduling information reporting)
> HARQ function (Error correction through HARQ)
> Logical channel priority control function (Priority handling between logical channels of one UE)
> UE priority control function (Priority handling between UEs by means of dynamic scheduling)
> MBMS service identification function (MBMS service identification)
> Transport format selection function (Transport format selection)
> Padding function (Padding)

The PHY layers 2*b*-20 and 2*b*-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 2C:
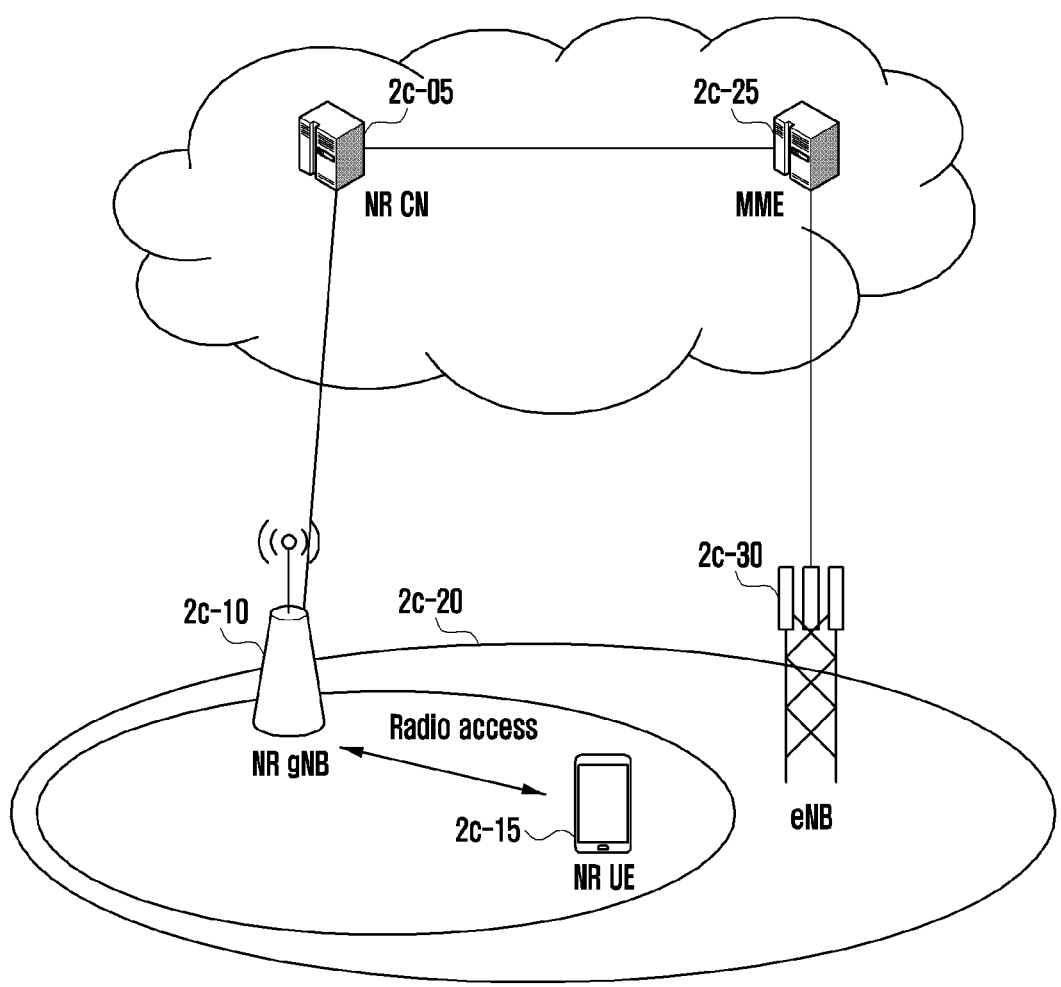
FIG. 2C illustrates a structure of a next-generation mobile communication system according to an embodiment of the disclosure.

FIG. 2C illustrates a structure of a next-generation mobile communication system according to an embodiment of the disclosure.

Referring to FIG. 2C, a radio access network of a next-generation mobile communication system (hereinafter, NR or 2*g*) includes a next-generation base station 2*c*-10 (new-radio node B) (hereinafter, referred to as an NR gNB or an NR base station) and a new-radio core network (NR CN) 2*c*-05. A user equipment 2*c*-15 (hereinafter, referred to as a new radio user equipment (NR UE) or a terminal) accesses an external network through the NR gNB 2*c*-10 and the NR CN 2*c*-05.

In FIG. 2C, the NR gNB 2*c*-10 corresponds to an evolved Node B (eNB) of the conventional LTE system. The NR gNB 2*c*-10 may be connected to the NR UE 2*c*-15 through a radio channel and may provide better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR gNB 2*c*-10. One NR gNB generally controls a plurality of cells. The NR gNB may have a bandwidth wider than the conventional maximum bandwidth in order to implement super-high-speed data transmission compared to conventional LTE and may apply orthogonal frequency division multiplexing (OFDM) through radio access technology and further apply beam-forming technology. Further, an adaptive modulation and coding (AMC) scheme of determining a modulation scheme and a channel coding rate is applied depending on the channel status of the UE. The NR CN 2*c*-05 performs a function of supporting mobility, configuring a bearer, and configuring a QoS. The NR CN 2*c*-05 is a device that serves to perform a function of managing mobility of the UE 2*c*-15 and various control functions and is connected to a plurality of NR gNBs. Further, the next-generation mobile communication system may be linked to the conventional LTE system, and the NR CN 2*c*-05 is connected to an MME 2*c*-25 through a network interface. The MME 2*c*-25 is connected to the eNB 2*c*-30 which is the conventional base station.

Figure 2D:
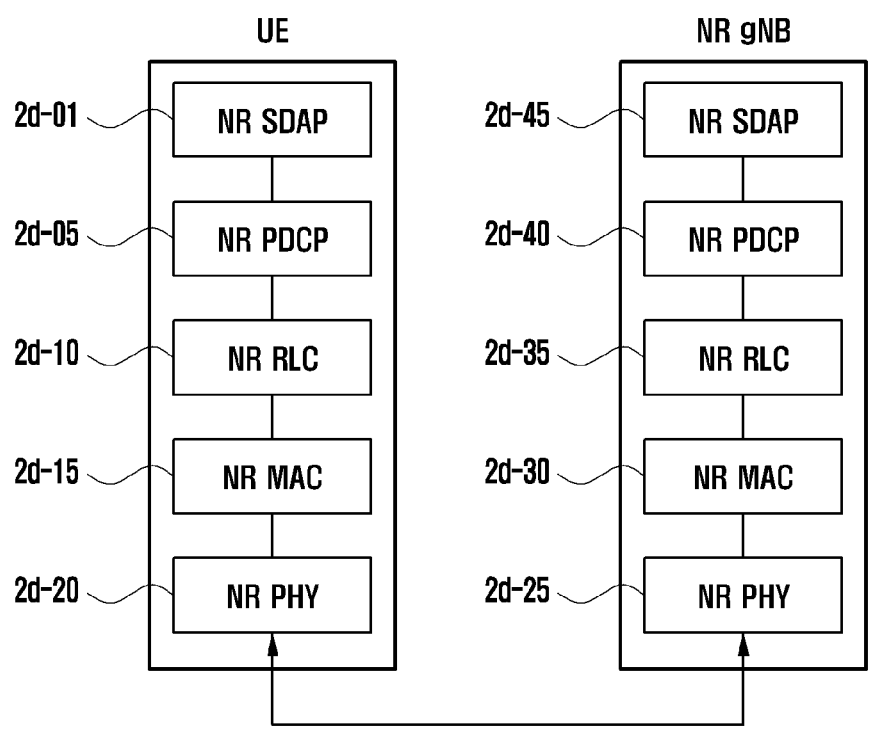
FIG. 2D illustrates a structure of a wireless protocol of the next-generation mobile communication system according to an embodiment of the disclosure.

FIG. 2D illustrates a structure of a wireless protocol of the next-generation mobile communication system according to an embodiment of the disclosure.

Referring to FIG. 2D, the UE and the NR gNB include NR SDAPs 2*d*-01 and 2*d*-45, NR PDCPs 2*d*-05 and 2*d*-40, NR RLCs 2*d*-10 and 2*d*-35, and NR MACs 2*d*-15 and 2*d*-30 in the wireless protocol of the next-generation mobile communication system.

The main functions of the NR SDAPs 2*d*-01 and 2*d*-45 may include some of the following functions.

> User data transmission function (transfer of user-plane data)
> Function of mapping QoS flow and a data bearer for uplink and downlink (mapping between a QoS flow and a DRB for both DL and UL)
> Function of marking a QoS flow ID for uplink and downlink (marking QoS flow ID in both DL and UL packets)
> Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 2*d*-05 and 2*d*-40 may include some of the following functions.

> Header compression and decompression function (Header compression and decompression: ROHC only)
> User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data, a function of recording PDCP PDUs lost due to the reordering, a function of reporting statuses of the lost PDCP PDUs to a transmitting side, and a function of making a request for retransmitting the lost PDCP PDUs.

The main functions of the NR RLC $2d$-10 and $2d$-35 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs $2d$-15 and $2d$-30 may be connected to a plurality of NR RLC layer devices included in one entity, and the main functions of the NR MACs may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The NR PHY layers $2d$-20 and $2d$-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

In the LTE system or the next-generation mobile communication system, the UE determines a modulation and coding scheme (MCS) in order to efficiently transmit and receive data to and from the BS in an RRC-connected mode. That is, the BS may determine which MCS table is configured in the UE. The MCS table may be classified into and defined as a total of three types through the following tables.

TABLE 1

| 1. MCS: supports 64 QAM | | | |
| --- | --- | --- | --- |
| MCS Index $I_{MCS}$ | Modulation Order $Q_m$ | Target code Rate R × [1024] | Spectral efficiency |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |

TABLE 1-continued

1. MCS: supports 64 QAM

| MCS Index $I_{MCS}$ | Modulation Order $Q_m$ | Target code Rate R × [1024] | Spectral efficiency |
|---|---|---|---|
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 2

2. MCS: supports 256 QAM

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 3

3. MCS: supports 64 QAM and is newly introduced to support URLLC service

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

An embodiment of the disclosure relates to a method and an apparatus for supporting a ultra-reliable-low latency communication (URLLC) service to a UE operating in an RRC-connected mode in a next-generation mobile communication system and, more particularly, to a method and an apparatus in which a BS configures new UE identifier information (new radio network temporary identifier (RNTI)) in a UE supporting a URLLC service through RRC signaling and the UE applies a new MCS table (that is, MCS table 3) so as to transmit and receive data to and from the BS. In an embodiment of the disclosure, new UE identifier information is referred to as an MCS-RNTI for convenience of the description. The UE identifier information is not limited to the term "MCS-RNTI", but may be referred to as an MCS-C-RNTI or an RNTI related to the use of MCS table 3. Hereinafter, the term "MCS-RNTI" will be used for convenience of the description. Further, an embodiment of the disclosure proposes methods by which the UE transmits and receives data to and from the BS by applying MCS table 3 when the BS does not configure the MCS-RNTI in the UE supporting the URLLC service through RRC signaling.

An embodiment of the disclosure proposes methods by which the UE monitors an MCS-RNTI in activated serving cells (activated SCells) in a specific bandwidth part (BWP) through RRC signaling. Further, an embodiment of the disclosure proposes methods by which the UE performs HARQ retransmission using an MCS-RNTI when the UE performs initial transmission to the BS through a dynamic grant and methods by which the UE performs HARQ retransmission using a configured scheduling (CS)-RNTI when the UE performs initial transmission to the BS through a configured grant.

The proposed methods may be very useful for reducing processing load of the UE and also useful for configuring a frequency aggregation technology or a dual connectivity technology by the UE in an environment in which small cells are arranged in a macro cell.

Figure 2E:
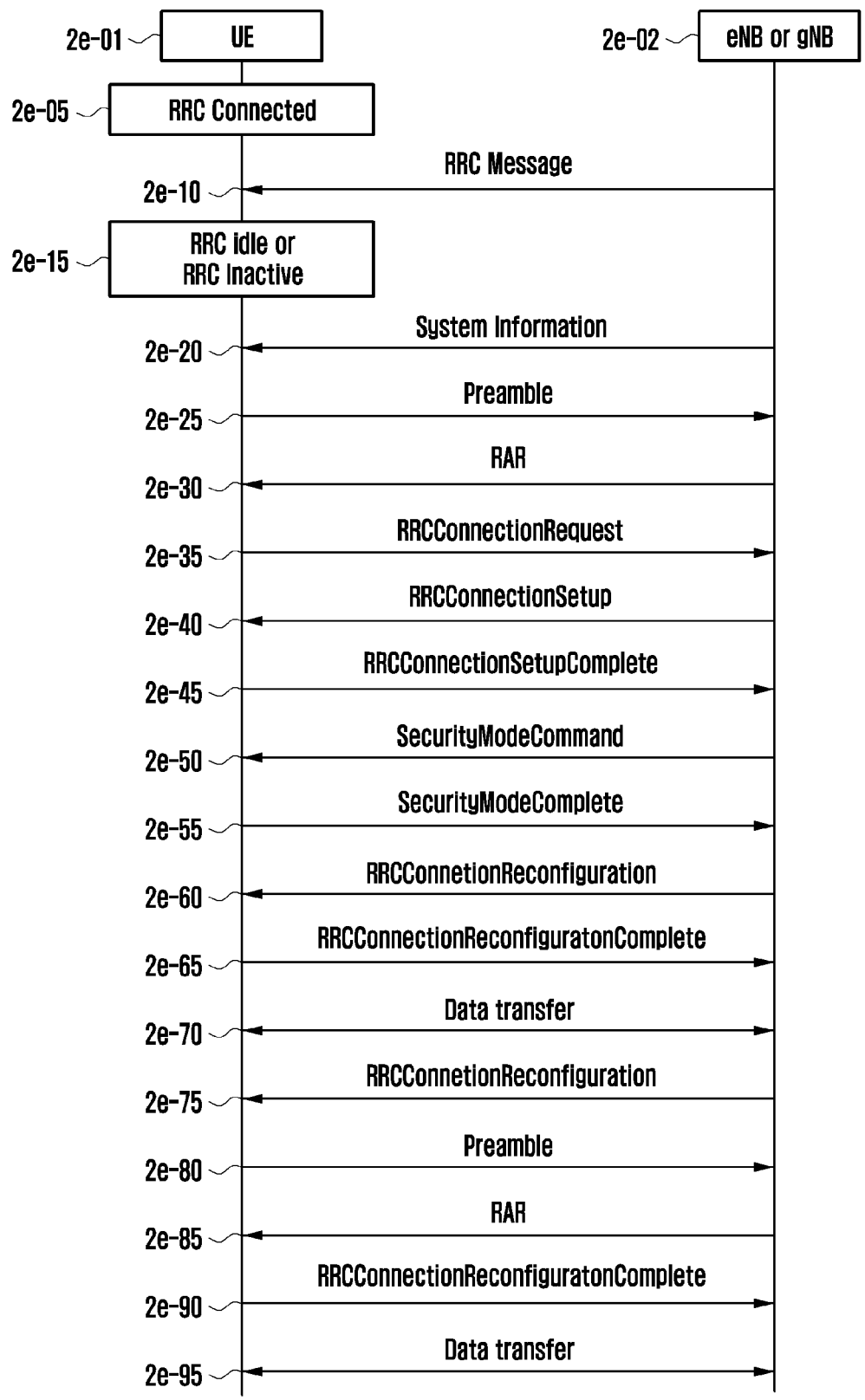
FIG. 2E illustrates a method of determining and applying a new MCS table through an RRC signaling method before or after entry into an RRC-connected mode according to an embodiment of the disclosure.

FIG. 2E illustrates a method of determining and applying a new MCS table through an RRC signaling method before or after entry into an RRC-connected mode according to an embodiment of the disclosure.

In FIG. 2E, when a UE 2e-01 transmitting/receiving data in an RRC-connected mode has no data transmission/reception for a predetermined reason or for a predetermined time, a BS (eNB or gNB) 2e-02 transmits an RRC message (for example, an RRC connection release, RRC connection suspend, or new RRC message (for example, ToInactive)) to the UE 2e-01, and thus the UE 2e-01 may switch to an RRC-idle mode or an RRC-inactive mode 2e-15 in step 2e-10. In the RRC-idle mode or the RRC-inactive mode, the UE 2e-01 performs cell selection or cell reselection during movement and discovers a suitable cell, and when a cell, on which the UE will camp on, reads system information of the cell in step 2e-20. That is, the UE 2e-01 may camp on any cell in the RRC-idle mode or the RRC-inactive mode and read information on a frequency on which frequency measurement is performed, a priority of the frequency, and timer information from system information of the corresponding cell (for example, SIB5 in the LTE system and SIB1, SIB2, SIB3, SIB4, or SIB5 in the next-generation mobile communication system).

In the future, when data to be transmitted is generated, the UE 2e-01 in the RRC-idle mode or the RRC-inactive mode in which the connection is not currently established performs an RRC connection establishment process with the BS 2e-02. The UE 2e-01 establishes backward transmission synchronization with the BS 2e-02 through a random access process in steps 2e-25 and 2e-30, and transmits an RRC-ConnectionRequest message to the BS in step 2e-35. The message includes a reason (establishmentCause) to establish the connection with an identifier of the UE. The BS 2e-02 transmits an RRCConnectionSetup message to allow the UE 2e-01 to establish the RRC connection in step 2e-40. The message includes bearer configuration information (RadioBearerConfig) and cell group configuration information (CellGroupConfig) which are RRC connection configuration information. The RRC connection is also referred to as a signaling radio bearer (SRB), and is used for transmitting and receiving an RRC message, which is a control message, between the UE 2e-01 and the BS 2e-02. The UE establishing the RRC connection (hereinafter, referred to as a connected mode UE) transmits an RRCConnectionSetupComplete message to the BS 2e-02 in step 2e-45.

The RRCConectionSetupComplete message includes a control message corresponding to a SERVICE REQUEST by which the UE 2e-01 makes a request for establishing a bearer for a predetermined service to the MME or the AMF. The BS 2e-02 transmits the SERVICE REQUEST message included in the RRCConnectionSetupComplete message to the MME or the AMF, and the MME or the AMF determines whether to provide the service requested by the UE 2e-01. When it is determined to provide the service requested by the UE 2e-01 on the basis of the determination result, the MME or the AMF transmits an INITIAL CONTEXT SETUP REQUEST message to the BS 2e-02. The message includes Quality of Service (QoS) information to be applied to Data Radio Bearer (DRB) configuration and security-related information to be applied to the DRB (for example, a security key and a security algorithm). The BS 2e-02 completes security configuration by exchanging a SecurityModeCommand message and a SecurityModeComplete message to configure security with the UE 2e-01 in steps 2e-50 and 2e-55.

When the security configuration is completed in steps 2e-50 and 2e-55, the BS 2e-02 transmits an RRCConnectionReconfiguration message to the UE 2e-01 in step 2e-60. The message may include bearer configuration information (RadioBearerConfig), cell group configuration information (CellGroupConfig), or frequency measurement information (MeasConfig) which the UE 2e-01 should measure. Further, the message includes configuration information of the DRB for processing user data, and the UE 2e-01 configures the DRB by applying the information and transmits an RRC-ConnectionReconfigurationComplete message to the BS 2e-02 in step 2e-65.

The BS 2e-02 completed the DRB configuration with the UE 2e-01 transmits the INITIAL CONTEXT SETUP COMPLETE message to the MME or the AMF, and the MME or the AMF receiving the same enables data transmission between an S-GW or a UPF and the BS 2e-02 through a bearer configuration process with the S-GW or the UPF, and thus the UE 2e-01 transmits and receives data to and from the BS 2e-02 via the S-GW or the UPF through the process in step 2e-70.

The BS 2e-02 may transmit an RRCConnection Reconfiguration message to newly make, add, or change configuration to the UE 2e-01 for a predetermined reason in step 2e-75. The RRCConnectionReconfiguration message may include a ReconfigurationWithSync information element (IE) including parameters for synchronization reconfiguration of a target SpCell. When the RRCConnectionReconfiguration message of step 2e-75 includes the ReconfigurationWith Sync IE, the UE 2e-01 performs a content and non-content-based random access procedure with the BS 2e-02. In order to allow the UE 2e-01 to perform the non-content-based random access, dedicated random access resources may be allocated to the RRCConnectionReconfiguration message of step 2e-75. The UE 2e-01 transmits a random access preamble through a physical channel for random access in order to access the BS 2e-02 in step 2e-80. When the BS 2e-02 receives the preamble, a random access response (RAR) message thereof is transmitted to the UE 2e-01 in step 2e-85.

The RAR message of step 2e-85 includes identifier information of the preamble used in step 2e-80 to contain uplink transmission timing correction information, uplink resource allocation information, and temporary UE identifier information or UE identifier information. The uplink resource allocation information is detailed information on resources to be used by the UE 2e-01 in the future and includes the physical location and size of resources, a modulation and coding scheme (MCS) used for transmission, and transmission power control information. When the UE 2e-01 transmitting the preamble performs initial access, the UE 2e-01 does not possess an identifier allocated by the BS for communication with the BS 2e-02, and thus the temporary UE identifier information is a transmitted value to be used for the same.

Meanwhile, when the RAR message is transmitted, the BS 2e-02 schedules the corresponding RAR message through a PDCCH, and the corresponding scheduling information is scrambled using a random access-radio network temporary identifier (RA-RNTI). The RA-RNTI is mapped to physical random access channel (PRACH) resources used for transmitting the message of step 2e-80, and the UE 2e-01 transmitting the preamble through specific PRACH resources attempts to receive a PDCCH on the basis of the corresponding RA-RNTI and determines whether there is a corresponding RAR message. The UE 2e-01 receiving the RAR message determines a transport block (TB) size and an MCS table through an uplink allocated by the RAR message, and then transmits an RRCConnectionReconfigurationComplete message to the BS 2e-02 in step 2e-90.

When the RRCConnectionReconfiguration message of step 2e-75 does not include the ReconfigurationWith Sync IE, the UE 2e-01 transmits the RRCConnectionReconfigurationComplete message to the BS 2e-02 without any random access process in step 2e-90.

The RRC message ((RRC Connection Reconfiguration of steps 2e-60 and 2e-75) may include the following information.

1. A cell group identifier (CellGroupID) by which a cell group can be identified since only one master cell group (MCS) may be configured, one master cell group and one secondary cell group (SCG) or a plurality of SCGs may be configured 2. RLC bearer configuration information (rlc-BearerToAddModList and rlc-BearerToReleaseList)

A. RLC bearer configuration information may include a LogicalChannelConfig information element (IE) used for configuring a logical channel parameter, and the corresponding IE may include information on a time at which uplink MAC SDUs can be transmitted in a logical channel (maxPUSCH-Duration: If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration).

3. MAC configuration information (mac-CellGroupConfig) and PHY configuration information (physicalCellGroupConfig) to be configured and used for each cell group (cell group specific)

A. PHY configuration information may include only a new RNTI (MCS-RNTI) used for MCS table 3.

B. PHY configuration information may include an MCS-RNTI used for MCS table 3 and a list of bandwidth part identifiers (BWP IDs) and ControlResourceSet IDs, SearchSpace IDs, and SCell identifiers (SCell Index) corresponding to the corresponding BWP IDs (MCS-RNTI & list of {BWP id(and ControlResourceSet IDs and SearchSpace IDs), SCell Index}).

C. PHY configuration information may include a CS-RNTI value for downlink semi-persistent scheduling (SPS) or a CS-RNTI value for uplink configured grant (CG).

4. SpCell configuration information (SpCellConfig) for differently configuring a parameter of the SpCell (for example, referring to a PCell in an MCG and a PSCell in an SCG) configured for each cell group A. SpCell configuration information may include a serving cell identifier (ServeCellIndex) for identifying the corresponding SpCell.

B. SpCell configuration information may include a ReconfigurationWithSync information element (IE) including parameters for the synchronous reconfiguration to the target SpCell, and the corresponding IE may include UE identifier information (for example, a C-RNTI value) and information on a target SpCell or a target Scell (for example, a physical cell identifier (Phycell ID)).

C. Since the SpCell configuration information may introduce and use a separate configuration parameter for each SpCell, the spCellConfigDedicated IE may include ServingCellConfig, and when the spCellConfigDedicated IE includes ServingCellConfig, configure an SpCell according to an indication of the configured information.

5. scellToAddModList or sCellToReleaseList information for adding, modifying, or releasing one or a plurality of SCells for each cell group A. sCellToAddModList includes a serving cell identifier (SCellIndex) for identifying an SCell.

B. sCellToAddModList may include common configuration parameters (ServingCellConfigCommon) for configuring several Scells at once.

C. sCellToAddModList may include configuration parameters (ServingCellConfig) for respective Scells.

D. sCellToReleaseList may include serving cell identifiers (SCellIndex) for configured SCells and, when the serving cell identifier is included, may mean release of the corresponding SCell.

6. When SCells are configured, information for configuring an initial state as an activated state, a dormant state, or a deactivated state may be included. When the state of each SCell is configured as an activated state or a dormant state through the RRC message, an integer indicating when PDCCH monitoring starts may be included and configured.

7. When an initial state of each Scell is configured as an activated state, one or a plurality of BWPs may be configured in the SCell configured as the activated state and configuration information for a maximum of four BWPs may be included.

A. BWP configuration information may include frequency/time resource information and subcarrier spacing information, and further include information on cyclic prefix (CP) (for example, normal CP or extended CP).

B. BWP configuration information includes uplink BWP configuration information. A bandwidth part identifier (BWP ID) is stated in the uplink BWP configuration information, and common configuration parameters (BWP-UplinkCommon) may be included to configure a plurality BWP IDs at once. The common configuration parameters may include RACH configuration information (rach-ConfigCommon), PUSCH configuration information (pusch-configcommon), or PUCCH configuration information (PUCCH-ConfigCommon). Individual configuration parameters (BWP-UplinkDedicated) may be included to separately configure respective BWP IDs. The individual configuration parameters may include PUCCH configuration information (PUCCH-Config), PUSCH configuration information (PUSCH-Config), or ConfiguredGrantConfig.

i. A ConfiguredGrantConfig information element (IE) may include a value which may indicate MCS table 3 in an mcs-Table. For example, in mcs-Table ENUMERATE {qam256, spare1}, the value indicating MCS table 3 may be added to spare1. When a value of qam64 is allocated to spare1, the value may instruct the UE to apply MCS table 3. The spare field value may be configured as qam64LowSE. The configured value may be a value indicating MCS table 3. Further, the corresponding IE may contain configuration information for configured grant transmission (rrc-ConfiguredUplinkGrant). The UE may be instructed to transmit a UL grant (type 2) in which DCI is a CS-RNTI when there is no rrc-ConfiguredUplinkGrant field value, and the UE may be instructed to transmit a UL grant (type 1) configured as RRC when there is an rrc-ConfiguredUplinkGrant field value. Further, information (periodicity) for determining a period on which a CG is periodically transmitted regardless of a UL Configured Grant (CG) Type to the UE may be included in the ConfiguredConfig IE.

ii. The PUSCH-Config IE may include information for configuring PUSCH parameters which can be applied to a specific BWP for each UE. A value indicating MCS table 3 may be included in an mcs-Table which can be included in the IE. For example, in mcs-Table ENUMERATE {qam256, spare1}, the value indicating MCS table 3 may be added to spare1. When a value of qam64 is allocated to spare1, the value may instruct the UE to apply MCS table 3.

C. BWP configuration information includes downlink BWP configuration information. A bandwidth part (BWP ID) is stated in the downlink BWP configuration information, and the downlink BWP configuration information may include common configuration parameters (BWP-DownlinkCommon) in order to configure a plurality of BWP IDs at once. The common configuration parameters may include PDCCH configuration information (PDCCH-ConfigCommon) or PDSCH configuration information (PDSCH-ConfigCommon). Individual configuration parameters (BWP-DownlinkDedicated) may be included to separately configure respective BWP IDs. The individual configuration parameters may include PDCCH configuration information (PDCCH-Config), PDSCH configuration information (PDSCH-Config), or SPS configuration information (SPS-Config).

i. A PDCCH-ConfigCommon information element (IE) may include information required when a handover is generated, a cell for each cell group is added/changed/or released, or a PDCCH parameter for each cell provided from system information (for example, SIB1) is configured.

1. The information may include one or a plurality of time/frequency control resource sets (CORESETs) to find downlink control information (DCI).

2. The information may include SearchSpace defined to find a place in which a PDCCH is generated (SearchSpace defines how/where to search for PDCCH candidates). For example, the information may include a common SearchSpace (commonSearchSpace) for each cell, a SearchSpace ID for an SIB1 message (searchSpaceSIB1), a SearchSpace ID for messages other than SIB1 (searchSpaceOtherSystemInformation), a SearchSpace ID for paging (pagingSearchSpace), and a SearchSpace ID for a random access procedure (ra-SearchSpace).

ii. The PDCCH-Config IE may include information required when a PDCCH parameter for each UE is configured.

1. A list for adding or modifying a CORESET (controlResourceSetToAddModList)

2. A list for releasing a CORESET (controlResourceSetToReleaseList)

3. A list for adding or modifying a search space (searchSpaceToAddModList)

4. A list for releasing a search space (searchSpaceToReleaseList)

5. A common search space (common SearchSpace) according to a search type and a search space for each UE (ue-specific Searchspace)

iii. A maximum of three CORESETs may be included for each BWP, and a maximum of ten search spaces may be defined and included for each BWP. Further, one search space includes information such that the search space is associated with one CORESET (Each search space is associated with one CORESET).

iv. The PDSCH-Config IE may include information for configuring a PDSCH parameter for each UE.

1. A value indicating MCS table 3 may be included in the mcs-Table. For example, in mcs-Table ENUMERATE {qam256, spare1}, the value indicating MCS table 3 may be added to spare1. When a value of qam64 is allocated to spare1, the value may instruct the UE to apply MCS table 3.

8. Information indicating the application of a new MCS table to separate configuration parameters for SpCells or SCells for each cell group (ServingCellConfig IE is used to configured (add or modify) the UE with a serving cell, which may be the SpCell or an SCell of an MCG or SCG) or indicating that the application is possible may be included.

A. a downlink BWP list is configured to have a value of 0 or 1 in the ServingCellConfig IE, and thus 0 may indicate a downlink BWP to which MCS table 3 is not applied and 1 may indicate a downlink BWP to which MCS table 3 is applied. For example, downlinkBWP-ToAddModList Mask SEQUENCE (SIZE (1 . . . MaxNrofBWPs) of BOOLEAN may be included.

9. Information indicating the application of MCS table 3 to individual configuration parameters (BWP-DownlinkDediacted) for each BWP of SpCells or SCells for each cell group or indicating that the application is possible may be included. For example, the BWP-DownlinkDedicated IE may include NewMCSAllowed BOOLEAN.

After the UE 2e-01 receives the RRC message (RRC connection Reconfiguration Complete 2e-65 and 2e-80) from the BS 2e-02, the UE operation proposed when data transmission between the UE 2e-01 and the BS 2e-02 is possible is described below.

A. If PHY configuration information (physicalCellGroupConfig) includes MCS-RNTI+list of {BWP id (and CORESET IDs and Search Space IDs), serving cell id} in the RRC message (RRC Connection Reconfiguration in steps 2e-60 and 2e-75), the UE monitors an MCS-RNTI in a place included in the PHY configuration information.

B. If PHY configuration information (physicalCellGroupConfig) includes MCS-RNTI+list of {BWP id (and CORESET IDs and Search Space IDs, ue-Specific), serving cell id} in the RRC message (RRC Connection Reconfiguration in steps 2e-60 and 2e-75), the UE monitors an MCS-RNTI in a place included in the PHY configuration information.

C. If PHY configuration information (physicalCellGroupConfig) includes only an MCS-RNTI value and configuration parameters for SCells (ServingCellConfig) includes downlinkBWP-ToAddModList Mask SEQUENCE (SIZE (1 . . . MaxNrofBWPs) of BOOLEAN in the RRC message (RRC Connection Reconfiguration in steps 2e-60 and 2e-75), the UE monitors an MCS-RNTI in BWPs of serving cells indicated by the PHY configuration information and ServingCellConfig.

D. If PHY configuration information (physicalCellGroupConfig) includes only an MCS-RNTI value and individual configuration parameters for SCells (ServingCellConfig) for each downlink BWP (BWP-DownlinkDedicated) includes NewMCSAllowed BOOLEAN in the RRC message (RRC Connection Reconfiguration in steps 2e-60 and 2e-75), the UE monitors an MCS-RNTI in BWPs of serving cells indicated by the PHY configuration information and BWP-DownlinkDedicated.

E. If PHY configuration information (physicalCellGroupConfig) includes only an MCS-RNTI value and subcarrier spacing (SCS) included in BWP configuration information is a specific value, is equal to or smaller than a specific value, or is larger than or equal to a specific value in the RRC message (RRC Connection Reconfiguration in steps 2e-60 and 2e-75), the UE monitors an MCS-RNTI in BWPs in serving cells that satisfy the corresponding condition.

F. If PHY configuration information (physicalCellGroup-Config) includes only an MCS-RNTI value and periodicity in ConfiguredGrantConfig is equal to or smaller than a specific value in the RRC message (RRC Connection Reconfiguration in steps 2e-60 and 2e-75), the UE monitors an MCS-RNTI in BWPs in serving cells that satisfy the corresponding condition.

G. If PHY configuration information (physicalCellGroup-Config) includes only an MCS-RNTI value in the RRC message (RRC Connection Reconfiguration in steps 2e-60 and 2e-75), the UE monitors an MCS-RNTI in BWPs in serving cells for UL CG Type 1 configured by the BS.

Information included in the RRC message (RRC Connection Reconfiguration in steps 2e-60 and 2e-75) may be also included in an RRC Resume message or an RRC Setup message.

Figure 2F:
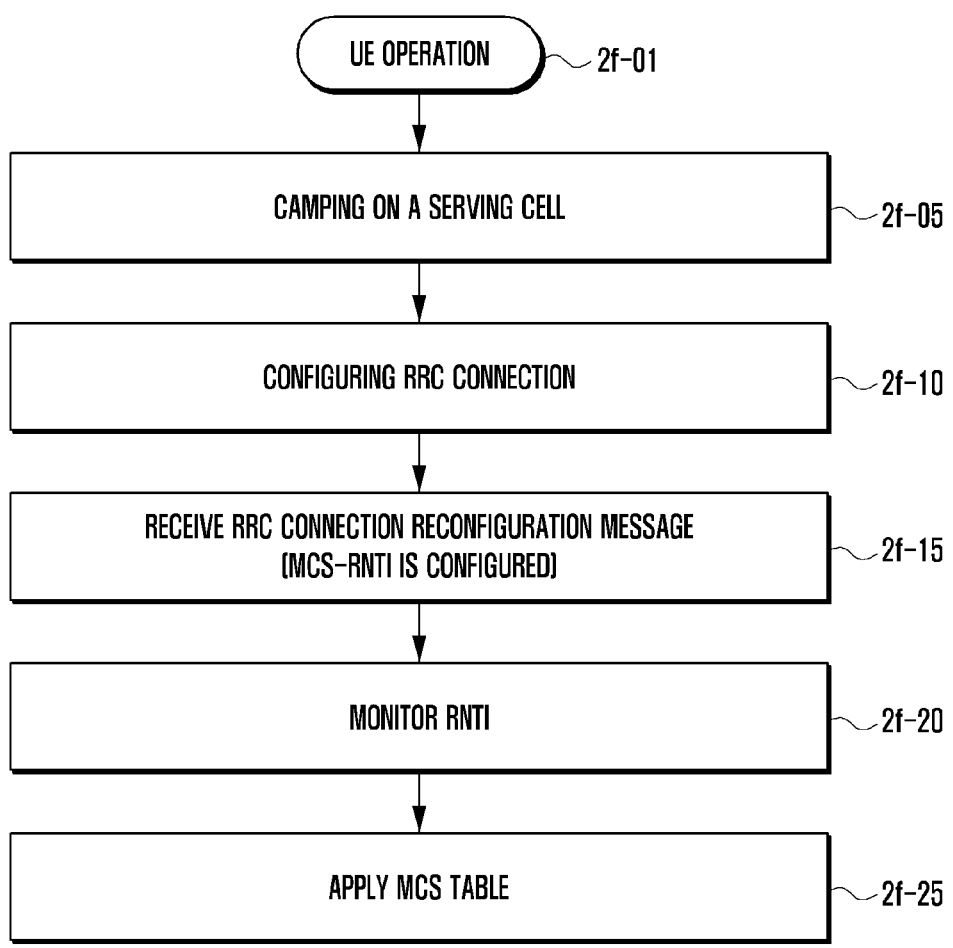
FIG. 2F illustrates an operation in which a UE in an RRC-connected mode applies an MCS table according to an embodiment of the disclosure.

FIG. 2F illustrates an operation in which a UE in an RRC-connected mode applies an MCS table according to an embodiment of the disclosure.

In FIG. 2F, a UE in an RRC-idle mode or an RRC-inactive mode discovers an appropriate cell and camps on the corresponding BS in step 2f-05, and accesses the BS for the reason of generation of data to be transmitted in step 2f-10. In the idle mode or the RRC-inactive mode, the UE is not connected to the network to save power of the UE, so the UE cannot transmit data. In order to transmit data, the UE is required to switch to a connected mode (RRC_CONNECTED). Camping means that the UE receives a paging message in order to determine whether data is received through downlink while staying in the corresponding cell. When the UE successfully performs the procedure of access to the BS, the UE switches to the connected mode (RRC_CONNECTED), and the UE in the connected mode is able to transmit and receive data to and from the BS.

In the RRC-connected state, the BS transmits RRC connection reconfiguration to the UE to change MCS-RNTI configuration information, CA configuration information, and CS/SPS configuration information in step 2f-15.

In step 2f-20, the UE may perform at least one of the following detailed operations.

Operation of monitoring a C-RNTI in activated serving cells.

Operation of monitoring a CS-RNTI for serving cells in which CS is configured.

Operation of monitoring an MCS-RNTI in an activated serving cell in BWPs configured through the RRC message.

In step 2f-30, the operation of the UE for applying the MCS table is described below.

When downlink control information (DCI) is determined as a C-RNTI (If DCI is addressed by C-RNTI or DCI format with CRC scrambled by C-RNTI), the UE applies MCS table 2 if an mcs-table parameter value is configured as qam256 in the RRC message.

When downlink control information (DCI) is determined as a C-RNTI (If DCI is addressed by C-RNTI or DCI format with CRC scrambled by C-RNTI), the UE applies MCS table 1 if an mcs-table parameter value is not configured in the RRC message.

When downlink control information (DCI) is determined as an MCS-RNTI (If DCI is addressed by MCS-RNTI or DCI format with CRC scrambled by MCS-RNTI), the UE applies MCS table 3.

When downlink control information (DCI) is determined as a CS-RNTI (If DCI is addressed by CS-RNTI or DCI format with CRC scrambled by CS-RNTI), the UE applies MCS table 2 if an mcs-table parameter value is configured as qam256 in the RRC message.

When downlink control information (DCI) is determined as a CS-RNTI (If DCI is addressed by CS-RNTI or DCI format with CRC scrambled by CS-RNTI), the UE applies MCS table 1 if an mcs-table parameter value is not configured in the RRC message.

When downlink control information (DCI) is determined as a CS-RNTI (If DCI is addressed by CS-RNTI or DCI format with CRC scrambled by CS-RNTI), the UE applies MCS table 3 if an mcs-table parameter value is configured as qam64 in the RRC message.

The embodiment of the disclosure is summarized below.

A new MCS table (MCS table 3) for URLLC has been introduced, and a new RNTI (MCS-RNTI or MCS-C-RNTI) may be configured through RRC in order to activate the new MCS table.

The new RNTI may be configured through physicalCellGroupConfig within CellGroupConfig. A common MCS-RNTI is for all cells within a cell group, and a new MCS table may be activated according to RRC configuration.

The embodiment of the disclosure proposes monitoring an MCS-RNTI in a specific BWP of a specific serving cell configured by RRC in order to reduce processing load of the UE. For HARQ retransmission using the new MCS table, the MCS-RNTI may be used for HARQ retransmission of dynamic allowance/allocation-based initial transmission. Further, the CS-RNTI may be used for HARQ retransmission of configured allowance/allocation-based initial transmission.

| Current RRC | Embodiment 1 | Refinement #1 | Refinement #2 |
|---|---|---|---|
| Signaling physicalCellGroupConfig MCS-RNTI Behavior UE monitors MCS-RNTI for all BWPs of all serving cells | Signaling physicalCellGroupConfig MCS-RNTI + list of {BWP id (or CORESET ID), serving cell id} Behavior UE monitors MCS-RNTI for the BWPs of serving cells indicated in the signaling | Signaling ServingCellConfig (new) downlinkBWP-ToAddModList-Mask SEQUENCE (SIZE (1..maxNrofBWPs)) OF BOOLEAN etc. physicalCellGroupConfig MCS-RNTI only Behavior UE monitors MCS-RNTI for the BWPs of serving cells indicated in the signaling | Signaling BWP-UplinkDedicated (new) NewMCSAllowed BOOLEAN physicalCellGroupConfig MCS-RNTI only Behavior UE monitors MCS-RNTI for the BWPs of serving cells indicated in the signaling |

The table may be interpreted as follows. When the MCS-RNTI is configured in physicalCellGroupConfig of the current RRC configuration, the UE may monitor the MCS-RNTI in all BWPs of all cells in the corresponding cell group, but it is unnecessary and thus may act as load to the UE.

According to embodiment 1 of the table, not only the MCS-RNTI but also at least one piece of identification information of the BWP and identification information of the serving cell may be included in physicalCellGroupConfig. A cell for monitoring the MCS-RNTI may be indicated by the identification information of the serving cell, and a BWP for monitoring the MCS-RNTI in the corresponding serving cell may be indicated by the identification information of the BWP. The UE may monitor the MCS-RNTI in the serving cell and the BWP indicated by the identification information of the serving cell and the identification information of the BWP. The identification information of the BWP and the identification information of the serving cell may be configured in different fields of the RRC message rather than in physicalCellGroupConfig, and may be configured through an MAC CE. Further, indication of the serving cell and the BWP through a different method is not excluded.

In the case of refinement #1 of the table, information indicating the BWP is newly added to the configuration of a downlinkBWP of ServingCellConfig. When the MCS-RNTI is configured in physicalCellGroupConfig, the UE may monitor the MCS-RNTI in a BWP in which a Boolean value is configured as True in downlinkBWP-related configuration information of ServingCellConfig, and may not monitor the MCS-RNTI in a BWP in which the Boolean value is configured as false.

In the case of refinement #2 of the table, a new field may be added to BWP-uplink-related configuration information and a BWP in which the MCS-RNTI should be monitored may be indicated. When the MCS-RNTI is configured in physicalCellGroupConfig, the UE may monitor the MCS-RNTI in a BWP indicated through the new field of the BWP-uplink-related configuration information.

Further, the UE should monitor the MCS-RNTI for a BWP in which subcarrier spacing (SCS) has a specific value and monitor the MCS-RNTI in a BWP in which a PUSCH duration time is smaller than the specific value. In addition, the MCS-RNTI should be monitored in a BWP in which type 1 CG is scheduled.

An ID or a type of a search space may be considered.

The MCS-RNTI may be monitored only for a predetermined search space ID and monitored only for a search space in a UE-specific type.

The embodiment of the disclosure is implemented as follows.

The UE camps on an NR cell. The UE receives RRCReconfiguration mesmess for a handover. The message may include MCS-RNTI configuration, CA configuration, and CS/SPS configuration to be used in a target cell. Further, the message may include the following information.

physicalCellGroupConfig
    MCS-RNTI & list of {BWP id (and CORESET IDs and SearchSpace IDs), serving cell id}
    SPS-RNTI
    . . .
  spCellConfig
    C-RNTI
    Target cell info
    . . . .

The UE transmits a preamble. The UE receives an RAR scrambled with an RA-RNTI. The UE uses MCS table 1 to determine an MCS and the size of a TB. The UE determines the TB size and the MCS for Msg3 on the basis of MCS table 1. The UE monitors a C-RNTI in an activated serving cell. The UE monitors a CS-RNTI in a cell in which CS is configured. Further, the UE monitors the MCS-RNTI and the C-RNTI together. The MCS-RNTI may be monitored in an RRC-configured cell, an RRC-configured BWP, an RRC-configured CORESET, and a UE-specific search space.

Thereafter, the UE receives DCI to be retransmitted. When the DCI is processed by the C-RNTI, the UE applies MCS table 1. When the DCI is processed by the MCS-RNTI, the UE applies MCS table 3. When the DCI is processed by the CS-RNTI and a configured grant is not configured for MCS table 3, the UE applies MCS table 1. When the DCI is processed by the CS-RNTI and a configured grant is configured for MCS table 3, the UE applies MCS table 3.

Figure 2G:
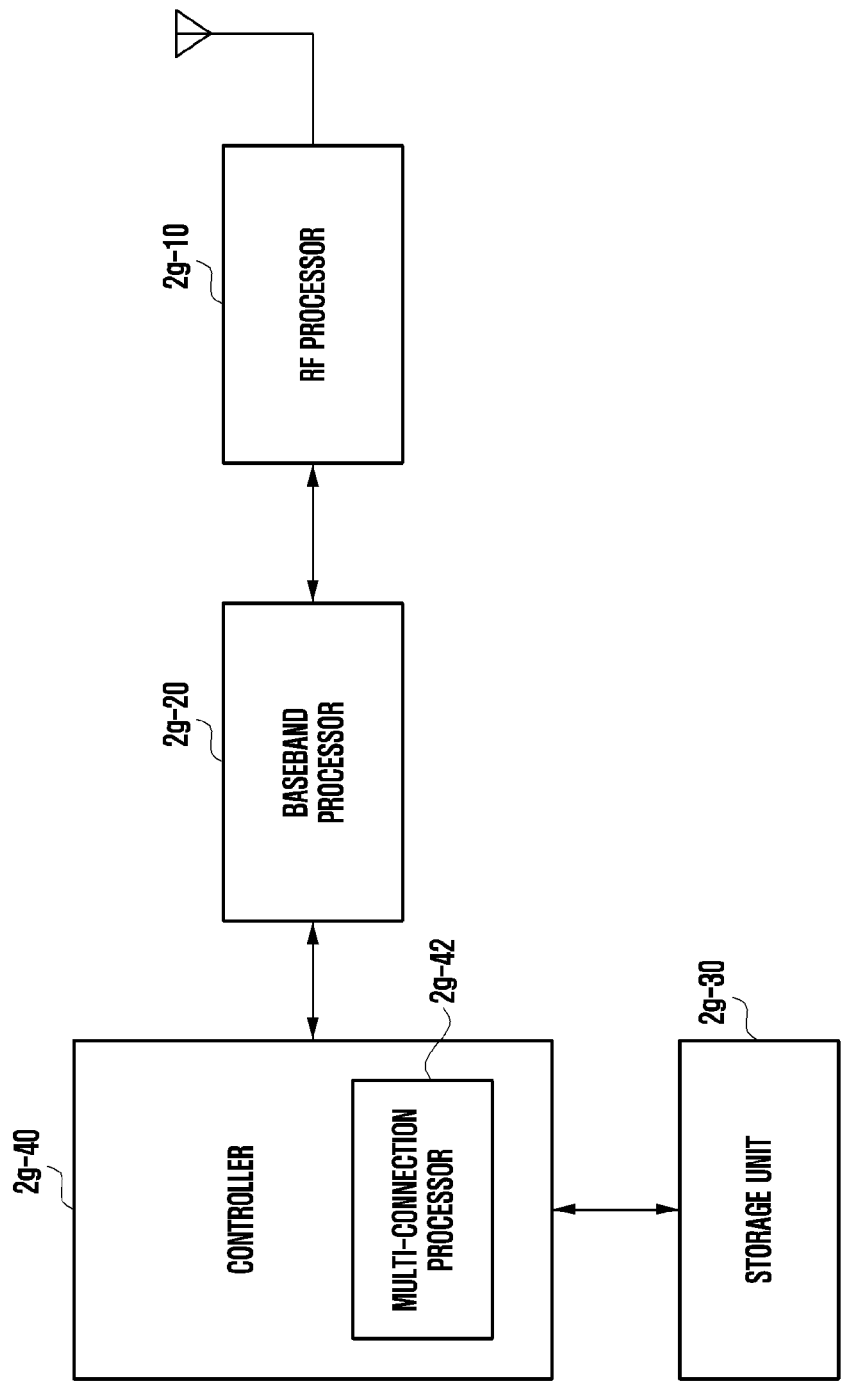
FIG. 2G illustrates a configuration of a UE according to an embodiment of the disclosure.

FIG. 2G illustrates a configuration of a UE according to an embodiment of the disclosure.

Referring to FIG. 2G, the UE includes a radio-frequency (RF) processor 2g-10, a baseband processor 2g-20, a storage unit 2g-30, and a controller 2g-40. The controller 2g-40 may further include a multi-connection processor 2g-42.

The RF processor 2g-10 performs a function for transmitting and receiving a signal through a wireless channel, such as band conversion and amplification of a signal. That is, the RF processor 2g-10 up-converts a baseband signal provided from the baseband processor 2g-20 into an RF band signal, transmits the RF band signal through an antenna, and then down-converts the RF band signal received through the antenna into a baseband signal. For example, the RF processor 2g-10 may include a transmission filter, a reception filter, an amplifier, a mixer, an oscillator, a digital-to-analog convertor (DAC), an analog-to-digital convertor (ADC), and the like. Although FIG. 2G illustrates only one antenna, the UE may include a plurality of antennas. In addition, the RF processor 2g-10 may include a plurality of RF chains. Moreover, the RF processor 2g-10 may perform beamforming. For the beamforming, the RF processor 2g-10 may control a phase and a size of each signal transmitted/received through a plurality of antennas or antenna elements. The RF processor may perform MIMO and receive a plurality of layers when performing the MIMO operation. The RF processor 2g-10 may perform reception beam sweeping by appropriately configuring a plurality of antennas or antenna elements according to the control of the controller or may control a direction of the reception beam or a beam width such that the reception beam cooperates with the transmission beam.

The baseband processor 2g-20 performs a function for a conversion between a baseband signal and a bitstream according to a physical layer standard of the system. For example, when data is transmitted, the baseband processor 2g-20 generates complex symbols by encoding and modulating a transmission bitstream. Further, when data is received, the baseband processor 2g-20 reconstructs a reception bitstream by demodulating and decoding a baseband signal provided from the RF processing unit 2g-10. For example, in an orthogonal frequency division multiplexing (OFDM) scheme, when data is transmitted, the baseband processor 2g-20 generates complex symbols by encoding and modulating a transmission bitstream, mapping the complex symbols to subcarriers, and then configures OFDM symbols through an IFFT (inverse fast Fourier transform) operation and a CP (cyclic prefix) insertion. Further, when data is received, the baseband processor 2g-20 divides the baseband signal provided from the RF processor 2g-10 in the unit of OFDM symbols, reconstructs the signals mapped to the subcarriers through an FFT (fast Fourier transform) operation, and then reconstructs a reception bitstream through demodulation and decoding.

The baseband processor 2g-20 and the RF processor 2g-10 transmit and receive a signal as described above. Accordingly, the baseband processor 2g-20 and the RF processor 2g-10 may be referred to as a transmitter, a receiver, a transceiver, or a communication unit. At least one of the baseband processor 2g-20 and the RF processor 2g-10 may include a plurality of communication modules for supporting a plurality of different radio access technologies. In addition, at least one of the baseband processor 2g-20 and the RF processor 2g-10 may include different communication modules to process signals of different frequency bands. For example, the different radio access technologies may include an LTE network and an NR network. Further, the different frequency bands may include a super high frequency (SHF) (for example, 2.2 gHz and 2 ghz) band and a millimeter (mm) wave (for example, 60 GHz) band.

The storage unit 2g-30 stores data such as a basic program, an application, and setting information for the operation of the UE. The storage unit 2g-30 provides the stored data according to a request from the controller 2g-40.

The controller 2g-40 controls overall operations of the UE. For example, the controller 2g-40 transmits and receives a signal through the baseband processing unit 2g-20 and the RF processing unit 2g-10. Further, the controller 2g-40 records data in the storage unit 2g-40 and reads the data. To this end, the controller 2g-40 may include at least one processor. For example, the controller 2g-40 may include a communication processor (CP) that performs a control for communication, and an application processor (AP) that controls a higher layer such as an application program.

Figure 2H:
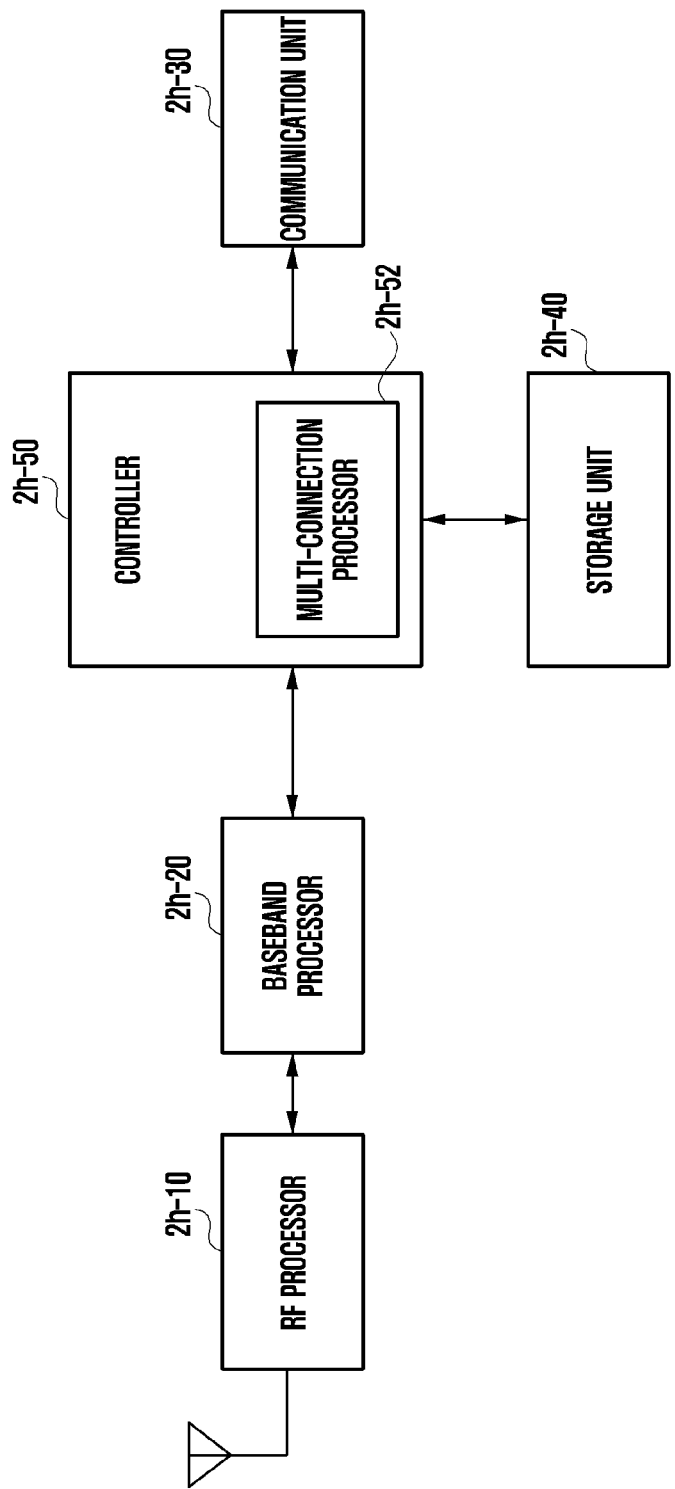
FIG. 2H illustrates a configuration of a BS according to an embodiment of the disclosure.

FIG. 2H illustrates a configuration of a BS according to an embodiment of the disclosure.

As illustrated in FIG. 2H, the BS includes an RF processor 2h-10, a baseband processor 2h-20, a backhaul communication unit 2h-30, a storage unit 2h-40, and a controller 2h-50. The controller 2h-50 may further include a multi-connection processor 2h-52.

The RF processor 2h-10 performs a function for transmitting and receiving a signal through a wireless channel, such as band conversion and amplification of a signal. That is, the RF processor 2h-10 up-converts a baseband signal provided from the baseband processor 2h-20 into an RF band signal, transmits the converted signal through an antenna, and down-converts the RF band signal received through the antenna into a baseband signal. For example, the RF processor 2h-10 may include a transmission filter, a reception filter, an amplifier, a mixer, an oscillator, a DAC, and an ADC. Although FIG. 2H illustrates only one antenna, the first access node may include a plurality of antennas. The RF processor 2h-10 may include a plurality of RF chains. Further, the RF processor 2h-10 may perform beamforming. For beamforming, the RF processor 2h-10 may control phases and sizes of respective signals transmitted and received through a plurality of antennas and antenna elements. The RF processor may perform a downlink MIMO operation by transmitting one or more layers.

The baseband processor 2h-20 performs a function of conversion between a baseband signal and a bitstream according to a physical-layer standard of the first radio access technology. For example, when data is transmitted, the baseband processor 2h-20 generates complex symbols by encoding and modulating a transmission bitstream. Further, when data is received, the baseband processor 2h-20 reconstructs a reception bitstream by demodulating and decoding a baseband signal provided from the RF processor 2h-10. For example, in an OFDM scheme, when data is transmitted, the baseband processor 2h-20 may generate complex symbols by encoding and modulating the transmission bitstream, map the complex symbols to subcarriers, and then configure OFDM symbols through an IFFT operation and CP insertion. In addition, when data is received, the baseband processor 2h-20 divides a baseband signal provided from the RF processor 2h-10 in units of OFDM symbols, recovers signals mapped with subcarriers through an FFT operation, and then recovers a reception bitstream through demodulation and decoding. The baseband processor 2h-20 and the RF processor 2h-10 may transmit and receive signals as described above. Accordingly, each of the baseband processor 2h-20 and the RF processor 2h-10 may be referred to as a transmitter, a receiver, a transceiver, a communication unit, or a wireless communication unit.

The communication unit 2h-30 provides an interface for communicating with other nodes within the network.

The storage unit 2h-40 stores data such as a basic program, an application, and configuration information for operating the MeNB. Particularly, the storage unit 2h-40 may store information on bearers allocated to the accessed UE and the measurement result reported from the accessed UE. Further, the storage unit 2h-40 may store information that is a reference for determining whether to provide multiple connections to the UE or stop the connections. The storage unit 2h-40 provides stored data according to a request from the controller 2h-50.

The controller 2h-50 controls the overall operation of the MeNB. For example, the controller 2h-50 transmits and receives a signal through the baseband processor 2h-20 and the RF processor 2h-10 or through the backhaul communication unit 2h-30. Further, the controller 2h-50 records data in the storage unit 2h-40 and reads the data. To this end, the controller 2h-50 may include at least one processor.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

What is claimed is:

1. A method performed by a terminal in a wireless communication system, the method comprising:
   receiving, from a base station, a first radio resource control (RRC) message including first information associated with a reconfiguration with synchronization for a handover and second information associated with a signaling radio bearer (SRB) list;
   identifying whether a first indicator associated with a reestablishment of packet data convergence protocol (PDCP) data, a second indicator associated with a discard on PDCP data, or a third indicator associated with a recovery of PDCP data is included in the second information;
   performing an operation of the recovery of PDCP data for at least one SRB associated with the third indicator, in case that the third indicator associated with the recovery of the PDCP data is included in the second information and the first information indicates the handover having no change in a PDCP security key; and transmitting, to the base station, a second RRC message as a response to the first RRC message,
wherein the operation of the recovery of PDCP data for the at least one SRB is performed for a specific RRC message that is transmitted to the base station before receiving the first RRC message and defined for a retransmission.

2. The method of claim 1, further comprising:
performing an operation of the reestablishment of PDCP data for at least one SRB associated with the first indicator, in case that the first indicator associated with the reestablishment of PDCP data is included in the second information,
wherein the operation of the reestablishment of the PDCP data includes discarding all data stored in the at least one SRBs associated with the first indicator, initializing a window status parameter for the at least one SRBs associated with the first indicator, and resetting a timer for alignment for the at least one SRB associated with the first indicator.

3. The method of claim 1, further comprising:
performing an operation of the discard on PDCP data for at least one SRB associated with the second indicator, in case that the second indicator associated with the discard on PDCP data is included in the second information,
wherein the operation of the discard on the PDCP data includes discarding all data stored in the at least one SRBs associated with the second indicator, initializing a window status parameter for the at least one SRBs associated with the second indicator, and resetting a timer for alignment for the at least one SRB associated with the second indicator.

4. The method of claim 1, further comprising:
identifying first data related to a transmission for the recovery of PDCP data among data stored in the at least one SRB that is configured before receiving the first RRC message; and
transmitting the first data to a lower layer,
wherein the first data includes data of which successful transmission is not identified among data transmitted to a reestablished RLC layer device or a connection-released RLC layer device.

5. The method of claim 1, further comprising:
identifying second data related to a reception for the recovery of PDCP data among the data stored in the at least one SRB that is configured before receiving the first RRC message;
processing the second data;
stopping a timer for alignment in case that the timer is running for the at least one SRB; and
resetting the timer for alignment.

6. The method of claim 1,
wherein the handover having no change in the PDCP security key includes a handover having no change in a central unit (CU) but having a change in a data unit (DU), and
wherein the reestablishment of the PDCP data is related to a case in which a handover having a change in a PDCP security key is instructed to the terminal.

7. The method of claim 1, wherein the first RRC message further includes a fourth indicator indicating whether to use a previous header compression protocol, and
wherein a header compression protocol is reset in case that the fourth indicator is not included in the first RRC message.

8. The method of claim 1, wherein the operation associated with the recovery of the PDCP data is performed in case that the at least one SRB associated with the third indicator is established before receiving the first RRC message and the second information includes the third indicator.

9. The method of claim 1, wherein the first RRC message indicates the specific RRC message for retransmission, in case that one of a power preference indication, overheating assistance information, SPS assistance information, delay budget report, or maximum bandwidth preference indication is configured for the terminal.

10. A method performed by a base station in a wireless communication system, the method comprising:
transmitting, to a terminal, a first radio resource control (RRC) message including first information associated with a reconfiguration with synchronization for a handover and second information associated with a signaling radio bearer (SRB) list; and
receiving, from the terminal, a second RRC message as a response to the first RRC message,
wherein an operation of a reestablishment of packet data convergence protocol (PDCP) data for at least one SRB associated with a first indicator is performed, in case that the first indicator associated with the reestablishment of PDCP data is included in the second information,
wherein an operation of a discard on PDCP data for at least one SRB associated with a second indicator is performed, in case that the second indicator associated with the discard on PDCP data is included in the second information,
wherein an operation of a recovery of PDCP data for at least one SRB associated with a third indicator is performed, in case that the third indicator associated with the recovery of PDCP data is included in the second information and the first information indicates the handover having no change in a PDCP security key, and
wherein the operation of the recovery of PDCP data for the at least one SRB is performed for a specific RRC message that is transmitted to the base station before receiving the first RRC message and defined for a retransmission.

11. A terminal in a wireless communication system, the terminal comprising:
a transceiver; and
a controller configured to:
receive, from a base station, a first radio resource control (RRC) message including first information associated with a reconfiguration with synchronization for a handover and second information associated with a signaling radio bearer (SRB) list,
identify whether a first indicator associated with a reestablishment of packet data convergence protocol (PDCP) data, a second indicator associated with a discard on PDCP data, or a third indicator associated with a recovery of PDCP data is included in the second information,
perform an operation of the recovery of PDCP data for at least one SRB associated with the third indicator, in case that the third indicator associated with the recovery of the PDCP data is included in the second information and the first information indicates the handover having no change in a PDCP security key, and
transmit, to the base station, a second RRC message as a response to the first RRC message, wherein the operation of the recovery of PDCP data for the at least one SRB is performed for a specific RRC message that is transmitted to the base station before receiving the first RRC message and defined for a retransmission.

12. The terminal of claim 11, wherein the controller is further configured to perform an operation of the reestablishment of PDCP data for at least one SRB associated with the first indicator, in case that the first indicator associated with the reestablishment of PDCP data is included in the second information, and wherein the operation of the reestablishment of the PDCP data includes discarding all data stored in the at least one SRBs associated with the first indicator, initializing a window status parameter for the at least one SRBs associated with the first indicator, and resetting a timer for alignment for the at least one SRB associated with the first indicator.

13. The terminal of claim 11, wherein the controller is further configured to perform an operation of the discard on PDCP data for at least one SRB associated with the second indicator, in case that the second indicator associated with the discard on PDCP data is included in the second information, and wherein the operation of the discard on the PDCP data includes discarding all data stored in the at least one SRBs associated with the second indicator, initializing a window status parameter for the at least one SRBs associated with the second indicator, and resetting a timer for alignment for the at least one SRB associated with the second indicator.

14. The terminal of claim 11, wherein the controller is further configured to:

identify first data related to a transmission for the recovery of PDCP data among data stored in the at least one SRB that is configured before receiving the first RRC message, and transmit the first data to a lower layer, wherein the first data includes data of which successful transmission is not identified among data transmitted to a reestablished RLC layer device or a connection-released RLC layer device.

15. The terminal of claim 11, wherein the controller is further configured to:

identify second data related to a reception for the recovery of PDCP data among the data stored in the at least one SRB that is configured before receiving the first RRC message, process the second data, stop a timer for alignment in case that the timer is running for the at least one SRB, and reset the timer for alignment.

16. The terminal of claim 11, wherein the handover having no change in the PDCP security key includes a handover having no change in a central unit (CU) but having a change in a data unit (DU), and wherein the reestablishment of the PDCP data is related to a case in which a handover having a change in a PDCP security key is instructed to the terminal.

17. The terminal of claim 11, wherein the first RRC message further includes a fourth indicator indicating whether to use a previous header compression protocol, and wherein a header compression protocol is reset in case that the fourth indicator is not included in the first RRC message.

18. The terminal of claim 11, wherein the operation associated with the recovery of the PDCP data is performed in case that the at least one SRB associated with the third indicator is established before receiving the first RRC message and the second information includes the third indicator.

19. The terminal of claim 11, wherein the first RRC message indicates the specific RRC message for retransmission, in case that one of a power preference indication, overheating assistance information, SPS assistance information, delay budget report, or maximum bandwidth preference indication is configured for the terminal.

20. A base station in a wireless communication system, the base station comprising:

a transceiver; and a controller configured to:

transmit, to a terminal, a first radio resource control (RRC) message including first information associated with a reconfiguration with synchronization for a handover and second information associated with a signaling radio bearer (SRB) list, and receive, from the terminal, a second RRC message as a response to the first RRC message, wherein an operation of a reestablishment of packet data convergence protocol (PDCP) data for at least one SRB associated with a first indicator is performed, in case that the first indicator associated with the reestablishment of PDCP data is included in the second information, wherein an operation of a discard on PDCP data for at least one SRB associated with a second indicator is performed, in case that the second indicator associated with the discard on PDCP data is included in the second information, wherein an operation of a recovery of PDCP data for at least one SRB associated with a third indicator is performed, in case that the third indicator associated with the recovery of PDCP data is included in the second information and the first information indicates the handover having no change in a PDCP security key, and wherein the operation of the recovery of PDCP data for the at least one SRB is performed for a specific RRC message that is transmitted to the base station before receiving the first RRC message and defined for a retransmission.

* * * * *